(12) United States Patent
Tamura et al.

(10) Patent No.: US 11,991,325 B2
(45) Date of Patent: May 21, 2024

(54) IMAGE PROCESSING APPARATUS, CONTROL METHOD, AND STORAGE MEDIUM TO DETECT A SHEET EDGE BASED ON MARKS PRINTED ON AN ADJUSTMENT CHART AND ACQUIRED REGIONS OF INTEREST IMAGES

(71) Applicant: CANON KABUSHIKI KAISHA, Tokyo (JP)

(72) Inventors: Hirokazu Tamura, Ibaraki (JP); Satoshi Ikeda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/372,005

(22) Filed: Jul. 9, 2021

(65) Prior Publication Data
US 2022/0021779 A1 Jan. 20, 2022

(30) Foreign Application Priority Data

Jul. 14, 2020 (JP) .................. 2020-120865
Oct. 9, 2020 (JP) .................. 2020-171564
May 31, 2021 (JP) .................. 2021-091615

(51) Int. Cl.
| | | |
|---|---|---|
| H04N 1/00 | (2006.01) | |
| G06T 7/13 | (2017.01) | |
| G06T 7/62 | (2017.01) | |
| H04N 1/08 | (2006.01) | |
| H04N 1/047 | (2006.01) | |

(52) U.S. Cl.
CPC ......... *H04N 1/00748* (2013.01); *G06T 7/13* (2017.01); *G06T 7/62* (2017.01); *H04N 1/00708* (2013.01); *H04N 1/00761* (2013.01); *H04N 1/08* (2013.01); *G06T 2207/20024* (2013.01)

(58) Field of Classification Search
CPC .. H04N 1/00761; H04N 1/08; H04N 1/00708; H04N 1/00748; G06V 10/225; G06V 10/245; G06V 10/25
USPC .................. 358/400–404, 2.1; 382/199
See application file for complete search history.

(56) References Cited

U.S. PATENT DOCUMENTS

| | | | | |
|---|---|---|---|---|
| 2012/0301033 A1* | 11/2012 | Fukunaga | ............ | G06V 20/63 382/195 |
| 2016/0162762 A1* | 6/2016 | Maeda | ............ | H04N 1/00708 358/1.18 |
| 2016/0219172 A1* | 7/2016 | Mita | .................. | H04N 1/00713 |
| 2016/0241730 A1* | 8/2016 | Mizuno | ............. | H04N 1/00572 |
| 2018/0052052 A1* | 2/2018 | Tanimura | ............... | G01J 3/463 |

(Continued)

FOREIGN PATENT DOCUMENTS

| | | | | |
|---|---|---|---|---|
| JP | 2008147976 A | | 6/2008 | |
| JP | 2009164807 A | * | 7/2009 | .......... H04N 1/3873 |
| JP | 2010237018 A | * | 10/2010 | |

(Continued)

*Primary Examiner* — Chad Dickerson
(74) *Attorney, Agent, or Firm* — Canon U.S.A., Inc. I.P. Division

(57) ABSTRACT

An image processing apparatus having a reading device to read an image from a sheet includes one or more controllers to perform operations. One image is read from one sheet by using the reading device. Edge detection processing is executed on the one image. At least one pair of edges is determined from among a plurality of edges based on information of the plurality of edges detected in the edge detection processing and size information of the one sheet.

17 Claims, 26 Drawing Sheets

(56) References Cited

U.S. PATENT DOCUMENTS

2018/0183968 A1\* 6/2018 Furukawa .......... H04N 1/00013
2019/0385285 A1\* 12/2019 Chen ........................ G06T 7/33

FOREIGN PATENT DOCUMENTS

| JP | 2013123119 A | 6/2013 |
| JP | 2016025446 A | 2/2016 |
| JP | 2016111628 A | 6/2016 |
| JP | 2016139026 A | 8/2016 |
| JP | 2018101852 A | 6/2018 |

\* cited by examiner

FIG.3

SHEET LIBRARY EDIT — 311

| SHEET NAME | SUB-SCANNING DIRECTION SHEET LENGTH (mm) | MAIN-SCANNING DIRECTION SHEET LENGTH (mm) | BASIS WEIGHT (g/m²) | SURFACE PROPERTY |
|---|---|---|---|---|
| ABC-MANUFACTURED PAPER RECYCLE 1 | 210 | 297 | 75 | PLAIN PAPER |
| ABC-MANUFACTURED PAPER RECYCLE 2 | 297 | 420 | 75 | PLAIN PAPER |
| DEF-MANUFACTURED PAPER EMBOSSED PAPER A-1 | 216 | 279 | 150 | EMBOSSED |
| DEF-MANUFACTURED PAPER COATED PAPER P-1 | 279 | 432 | 128 | DOUBLE-SIDED COATED |
| XYZ-MANUFACTURED PAPER COLOR 81 | 210 | 297 | 75 | PLAIN PAPER |
| XYZ-MANUFACTURED PAPER COLOR 82 | 210 | 297 | 75 | PLAIN PAPER |

ADD NEW — 320   EDIT — 321   DELETE — 322   PRINTING POSITION ADJUSTMENT — 323

FIG.4

SHEET ATTRIBUTE EDIT

| | | |
|---|---|---|
| SHEET NAME | XYZ-MANUFACTURED PAPER COLOR 81 | ~401 |
| SUB-SCANNING DIRECTION SHEET LENGTH (mm) | 210 | ~402 |
| MAIN-SCANNING DIRECTION SHEET LENGTH (mm) | 297 | ~403 |
| BASIS WEIGHT (g/m$^2$) | 75 | ~404 |
| SURFACE PROPERTY | PLAIN PAPER ▼ | ~405 |

420 — END EDIT

421 — CANCEL

FIG.5

| | SUB-SCANNING DIRECTION SHEET LENGTH (mm) | MAIN-SCANNING DIRECTION SHEET LENGTH (mm) | BASIS WEIGHT (g/m²) | SURFACE PROPERTY | PRINTING POSITION SHIFT AMOUNT (FRONT SIDE) | PRINTING POSITION SHIFT AMOUNT (BACK SIDE) |
|---|---|---|---|---|---|---|
| | ~512 | ~513 | ~514 | ~515 | ~520 | ~521 |
| SHEET NAME ~511 | | | | | | |
| 501 ABC-MANUFACTURED PAPER RECYCLE 1 | 210 | 297 | 75 | PLAIN PAPER | LEAD POSITION: 0.3 mm<br>SIDE POSITION: -0.1 mm<br>MAIN-SCANNING MAGNIFICATION: +0.02%<br>SUB-SCANNING MAGNIFICATION: +0.01% | LEAD POSITION: 0.2 mm<br>SIDE POSITION: 0.1 mm<br>MAIN-SCANNING MAGNIFICATION: 0.02%<br>SUB-SCANNING MAGNIFICATION: -0.03% |
| 502 ABC-MANUFACTURED PAPER RECYCLE 2 | 297 | 420 | 75 | PLAIN PAPER | LEAD POSITION: 0.0 mm<br>SIDE POSITION: -0.0 mm<br>MAIN-SCANNING MAGNIFICATION: +0.00%<br>SUB-SCANNING MAGNIFICATION: +0.00% | LEAD POSITION: 0.0 mm<br>SIDE POSITION: -0.0 mm<br>MAIN-SCANNING MAGNIFICATION: +0.00%<br>SUB-SCANNING MAGNIFICATION: +0.00% |
| 503 DEF-MANUFACTURED PAPER EMBOSSED PAPER A-1 | 216 | 279 | 150 | EMBOSSED | LEAD POSITION: 0.5 mm<br>SIDE POSITION: -0.5 mm<br>MAIN-SCANNING MAGNIFICATION: +0.02%<br>SUB-SCANNING MAGNIFICATION: +0.02% | LEAD POSITION: -0.3 mm<br>SIDE POSITION: 0.5 mm<br>MAIN-SCANNING MAGNIFICATION: +0.01%<br>SUB-SCANNING MAGNIFICATION: -0.03% |
| 504 DEF-MANUFACTURED PAPER COATED PAPER P-1 | 279 | 432 | 128 | DOUBLE-SIDED COATED | LEAD POSITION: 0.4 mm<br>SIDE POSITION: -0.2 mm<br>MAIN-SCANNING MAGNIFICATION: +0.12%<br>SUB-SCANNING MAGNIFICATION: +0.08% | LEAD POSITION: -0.2 mm<br>SIDE POSITION: 0.6 mm<br>MAIN-SCANNING MAGNIFICATION: -0.02%<br>SUB-SCANNING MAGNIFICATION: -0.01% |
| 505 XYZ-MANUFACTURED PAPER COLOR 81 | 210 | 297 | 75 | PLAIN PAPER | LEAD POSITION: 0.4 mm<br>SIDE POSITION: -0.2 mm<br>MAIN-SCANNING MAGNIFICATION: +0.12%<br>SUB-SCANNING MAGNIFICATION: +0.08% | LEAD POSITION: 0.0 mm<br>SIDE POSITION: -0.0 mm<br>MAIN-SCANNING MAGNIFICATION: +0.00%<br>SUB-SCANNING MAGNIFICATION: +0.00% |
| 506 XYZ-MANUFACTURED PAPER COLOR 82 | 210 | 297 | 75 | PLAIN PAPER | LEAD POSITION: 0.0 mm<br>SIDE POSITION: -0.0 mm<br>MAIN-SCANNING MAGNIFICATION: +0.00%<br>SUB-SCANNING MAGNIFICATION: +0.00% | LEAD POSITION: 0.0 mm<br>SIDE POSITION: -0.0 mm<br>MAIN-SCANNING MAGNIFICATION: +0.00%<br>SUB-SCANNING MAGNIFICATION: +0.00% |
| 507 FGH-MANUFACTURED PAPER GRAPH 75 | 210 | 297 | 75 | PLAIN PAPER | LEAD POSITION: 0.0 mm<br>SIDE POSITION: -0.0 mm<br>MAIN-SCANNING MAGNIFICATION: +0.00%<br>SUB-SCANNING MAGNIFICATION: +0.00% | LEAD POSITION: 0.0 mm<br>SIDE POSITION: -0.0 mm<br>MAIN-SCANNING MAGNIFICATION: +0.04%<br>SUB-SCANNING MAGNIFICATION: -0.02% |
| 508 FGH-MANUFACTURED PAPER PLAIN PAPER 2 | 210 | 297 | 75 | PLAIN PAPER | LEAD POSITION: -0.03 mm<br>SIDE POSITION: -0.07 mm<br>MAIN-SCANNING MAGNIFICATION: +0.06%<br>SUB-SCANNING MAGNIFICATION: -0.01% | LEAD POSITION: -0.03 mm<br>SIDE POSITION: -0.10 mm<br>MAIN-SCANNING MAGNIFICATION: +0.04%<br>SUB-SCANNING MAGNIFICATION: -0.02% |

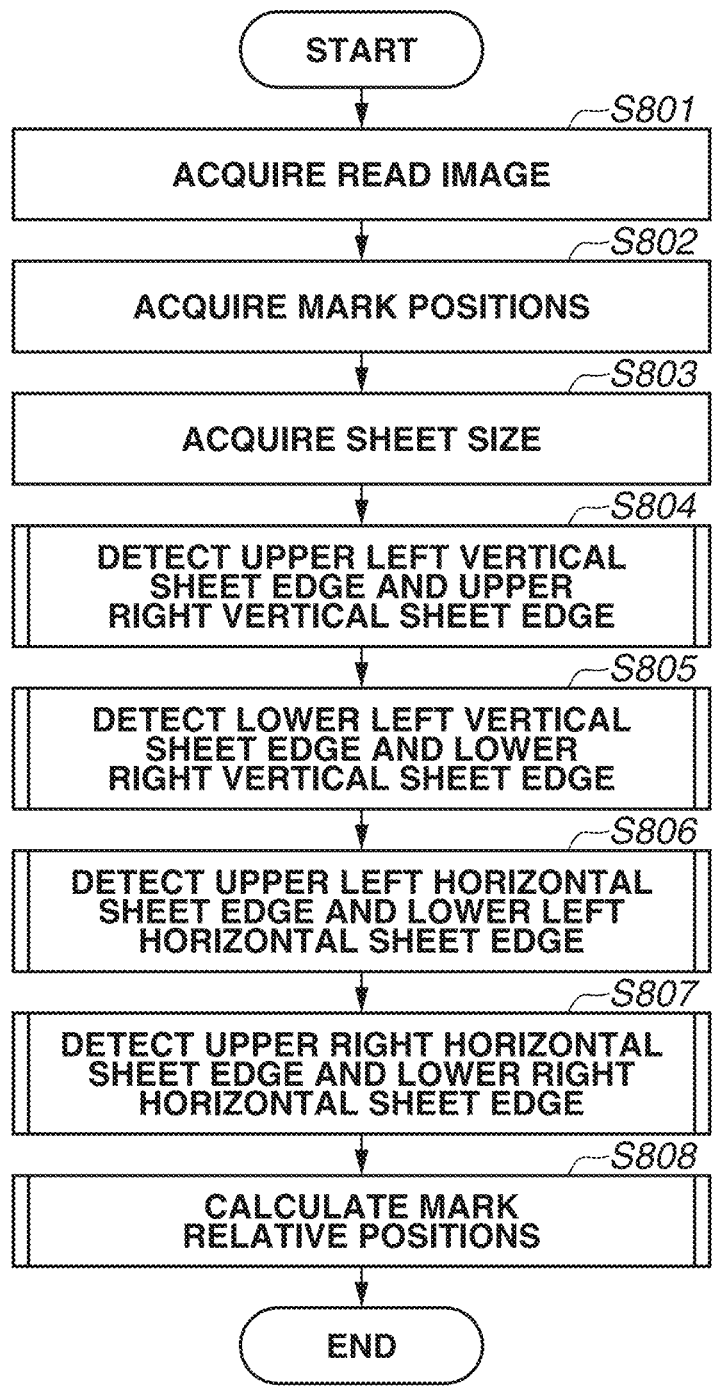

LEFT ROI HOUGH TABLE

| θ\ρ | 0 | 1 | 2 | 3 | 4 | 5 | 6 | ... |
|---|---|---|---|---|---|---|---|---|
| 88° | 0 | 0 | 0 | 0 | 0 | 0 | 0 | ... |
| 88.5° | 0 | 0 | 78 | 32 | 0 | 0 | 0 | ... |
| 89° | 0 | 78 | 219 | 32 | 0 | 0 | 0 | ... |
| 89.5° | 0 | 16 | 64 | 64 | 32 | 93 | 32 | ... |
| 90° | 0 | 0 | 32 | 0 | 93 | 232 | 93 | ... |
| 90.5° | 0 | 0 | 0 | 0 | 32 | 93 | 32 | ... |
| 91° | 0 | 0 | 0 | 9 | 0 | 0 | 0 | ... |
| 91.5° | 0 | 0 | 0 | 0 | 0 | 0 | 0 | ... |
| 92° | 0 | 0 | 0 | 0 | 0 | 0 | 0 | ... |

RIGHT ROI HOUGH TABLE

| θ\ρ | 0 | 1 | 2 | 3 | 4 | 5 | 6 | ... |
|---|---|---|---|---|---|---|---|---|
| 88° | 0 | 0 | 0 | 0 | 0 | 0 | 0 | ... |
| 88.5° | 0 | 0 | 78 | 32 | 0 | 0 | 0 | ... |
| 89° | 0 | 78 | 219 | 32 | 0 | 0 | 0 | ... |
| 89.5° | 0 | 16 | 64 | 64 | 32 | 93 | 32 | ... |
| 90° | 0 | 0 | 32 | 0 | 93 | 232 | 93 | ... |
| 90.5° | 0 | 0 | 0 | 0 | 32 | 93 | 32 | ... |
| 91° | 0 | 0 | 0 | 9 | 0 | 0 | 0 | ... |
| 91.5° | 0 | 0 | 0 | 0 | 0 | 0 | 0 | ... |
| 92° | 0 | 0 | 0 | 0 | 0 | 0 | 0 | ... |

PAPER SIZE [mm]

FIG.14

| θ\ρ | 0 | 1 | 2 | 3 | 4 | 5 | 6 | ... |
|---|---|---|---|---|---|---|---|---|
| 88° | 0 | 0 | 0 | 0 | 0 | 0 | 0 | ... |
| 88.5° | 0 | 0 | 78 | 32 | 0 | 0 | 0 | ... |
| 89° | 0 | 78 | 219 | 32 | 0 | 0 | 0 | ... |
| 89.5° | 0 | 16 | 64 | 64 | 0 | 0 | 0 | ... |
| 90° | 0 | 0 | 32 | 0 | 93 | 14 | 0 | ... |
| 90.5° | 0 | 0 | 0 | 0 | 93 | 93 | 93 | ... |
| 91° | 0 | 0 | 0 | 9 | 93 | 232 | 93 | ... |
| 91.5° | 0 | 0 | 0 | 0 | 0 | 93 | 93 | ... |
| 92° | 0 | 0 | 0 | 0 | 0 | 0 | 0 | ... |

SCANNED IMAGE

RIGHT-SIDE UPPER ROI IMAGE

BINARY IMAGE Ib(x, y)

SHEET EDGE: ($\theta = 89°$, $\rho = 2$)   READER STREAK: ($\theta = 90°$, $\rho = 5$)

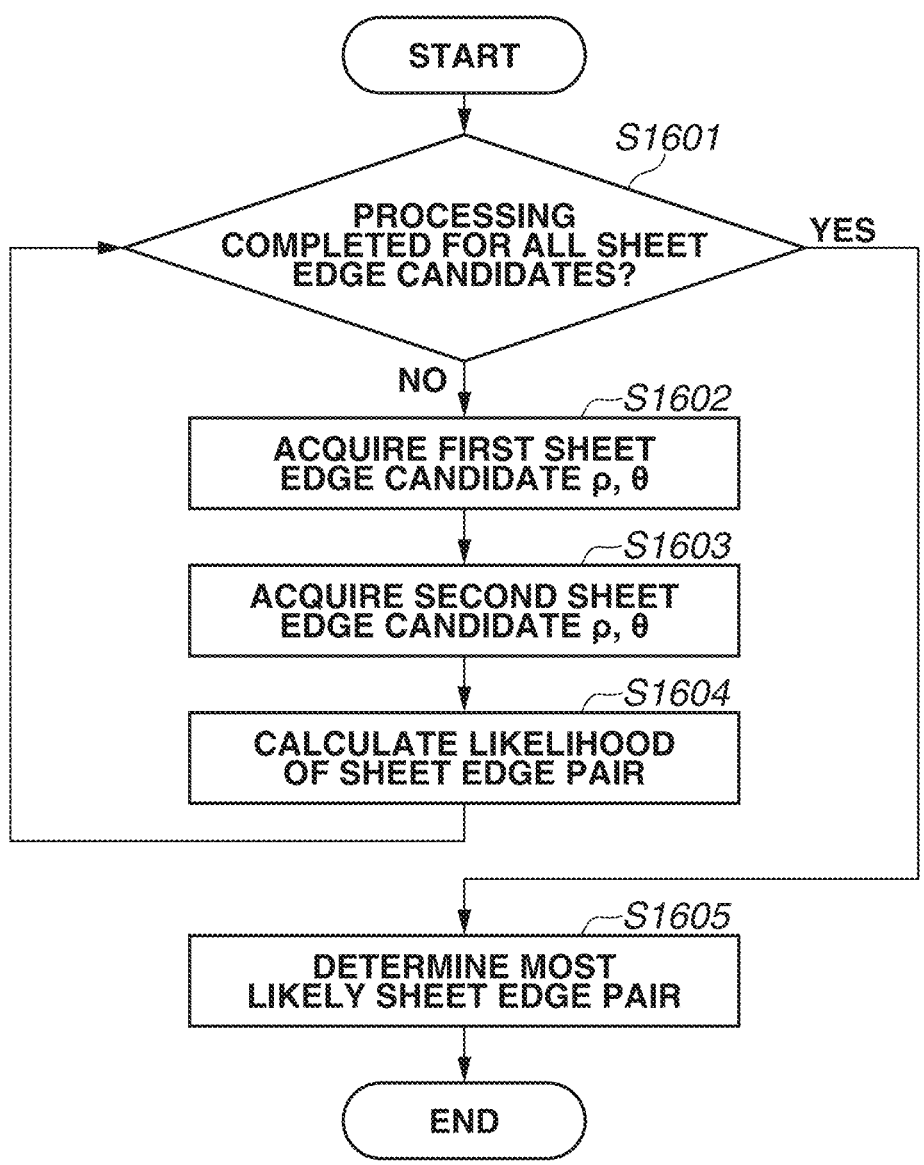

IMAGE PROCESSING APPARATUS, CONTROL METHOD, AND STORAGE MEDIUM TO DETECT A SHEET EDGE BASED ON MARKS PRINTED ON AN ADJUSTMENT CHART AND ACQUIRED REGIONS OF INTEREST IMAGES

BACKGROUND

Field

The present disclosure relates to an image processing apparatus that performs processing for adjusting an image forming position with respect to a sheet.

Description of the Related Art

In a print apparatus (image processing apparatus) that forms an image on a sheet, a function of adjusting an image forming position with respect to a sheet (hereinafter referred to as "printing position adjustment") is conventionally used. Japanese Patent Application Laid-Open No. 2016-111628 discusses a technique that acquires a printing position adjustment parameter, by printing a mark for adjustment on a sheet, reading the printed mark using a reader, and acquiring the positional relationship between the mark and a sheet edge. As an example of the reader, an automatic document feeding device for sheet, called an automatic document feeder (ADF), is also discussed.

The device discussed in Japanese Patent Application Laid-Open No. 2016-111628 has a room for improvement in the accuracy of detecting the sheet edge. This is because linear image noise called a reader streak can occur when a sheet is read using a mechanism such as the ADF. This reader streak is similar to the shadow of the sheet edge in appearance and thus can be detected as the sheet edge by mistake. If the sheet edge position cannot be accurately acquired, the position relative to the mark is not accurately acquired either, and thus the printing position adjustment parameter cannot be accurately acquired.

SUMMARY

The present disclosure is directed to an image processing apparatus that can appropriately detect a sheet edge even in a case where image noise is generated. In particular, the present disclosure is directed to an image processing apparatus that can accurately acquire a printing position adjustment parameter.

According to an aspect of the present disclosure, an image processing apparatus having a reading device to read an image from a sheet includes one or more controllers configured to perform operations including reading one image from one sheet by using the reading device, executing edge detection processing on the one image, and determining at least one pair of edges from among a plurality of edges based on information of the plurality of edges detected in the edge detection processing and size information of the one sheet.

Further features of the present disclosure will become apparent from the following description of exemplary embodiments with reference to the attached drawings.

BRIEF DESCRIPTION OF THE DRAWINGS

FIG. 3 is a diagram illustrating a sheet library edit screen.

FIG. 4 is a diagram illustrating a sheet library edit interface.

FIG. 5 is a table illustrating a sheet library.

FIG. 8 is a flowchart illustrating an operation of mark relative position measurement processing.

FIG. 14 is a diagram illustrating an example of a Hough table.

FIG. 16 is a flowchart illustrating an operation of optimum sheet edge pair determination processing.

DESCRIPTION OF THE EMBODIMENTS

<Control Block Diagram for Present Configuration>

Figure 1:
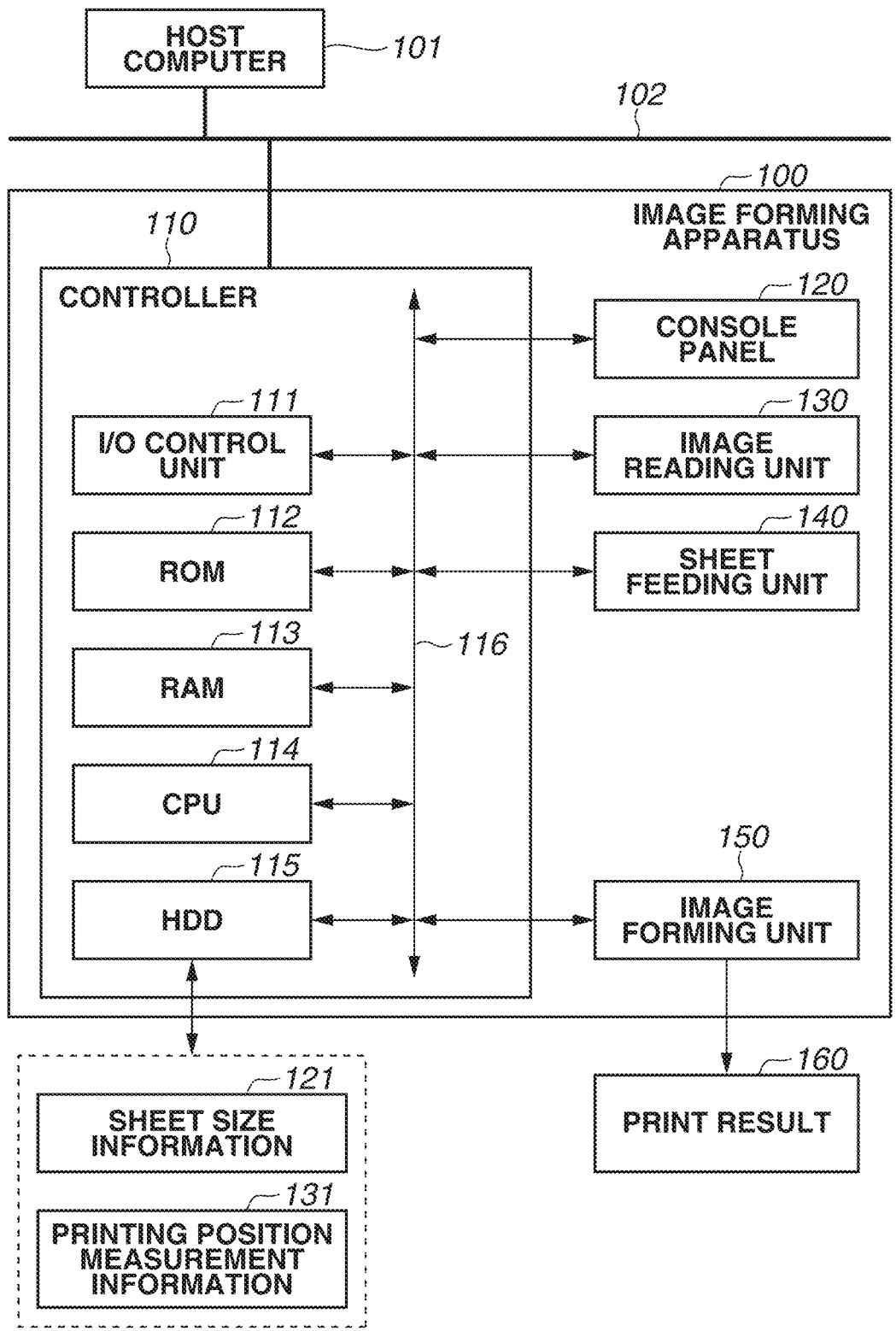
FIG. 1 is a control block diagram of a system including an image processing apparatus.

FIG. 1 is a block diagram schematically illustrating a hardware configuration of a print system (image processing system) according to an exemplary embodiment. The print system according to the present exemplary embodiment includes an image forming apparatus 100 and a host computer 101 as illustrated in FIG. 1. Further, the image forming apparatus 100 and the host computer 101 are connected with each other by a communication line 102. In the print system, a plurality of host computers, print apparatuses, and the like may be connected.

The host computer 101 can acquire input information from a user via an input device (not illustrated), create a print job to be transmitted to the image forming apparatus 100, and transmit the created print job to the image forming apparatus 100. A controller 110 performs various kinds of data processing and controls operations of the image forming apparatus 100. A console panel 120 employs a touch screen system and receives various operations from the user. As sheet size information 121, a print sheet size and a position adjustment amount are acquired from a sheet library via the console panel 120, as will be described below. An image reading unit 130 is a scanner that scans an original document using an optical sensor and acquires scanned-image data. As printing position measurement processing 131, the relative coordinates of a printing position with respect to a read image of a print result of a printing position adjustment chart (image having a predetermined pattern) are acquired, as will be described below. A sheet feeding unit 140 is a sheet feeder including a plurality of sheet feeding decks. Various print sheets can be stored in the sheet feeding decks. In each of the sheet feeding decks, only the uppermost one sheet among the stored sheets can be separated and conveyed to an image forming unit 150. The image forming unit 150 physically prints image data on a print sheet (sheet). In the present exemplary embodiment, the image forming unit 150 employing an electrophotographic method will be described, but an inkjet method may be used for the image forming unit 150. A print result 160 is a result of printing by the image forming unit 150.

Next, a configuration of the controller 110 will be described. An input/output (I/O) control unit 111 controls communication with an external network. A read only memory (ROM) 112 stores various control programs. A random access memory (RAM) 113 stores a control program read out from the ROM 112. A central processing unit (CPU) 114 executes the control program read into the RAM 113, and comprehensively controls image signals and various devices. A hard disk drive (HDD) 115 is used to hold a large amount of data such as image data and print data temporarily or for a long time. These modules are connected with each other via a system bus 116. The system bus 116 also connects the controller 110 and each device in the image forming apparatus 100. The RAM 113 also functions as a main memory and a work memory for the CPU 114. The control programs and an operating system are also stored in the HDD 115 in addition to the ROM 112. Further, a non-volatile RAM (NVRAM, not illustrated) may be included and store print apparatus mode setting information input from the console panel 120.

<Image Forming Apparatus>

Next, a structure and an operation of the image forming apparatus 100 will be described.

Figure 2:
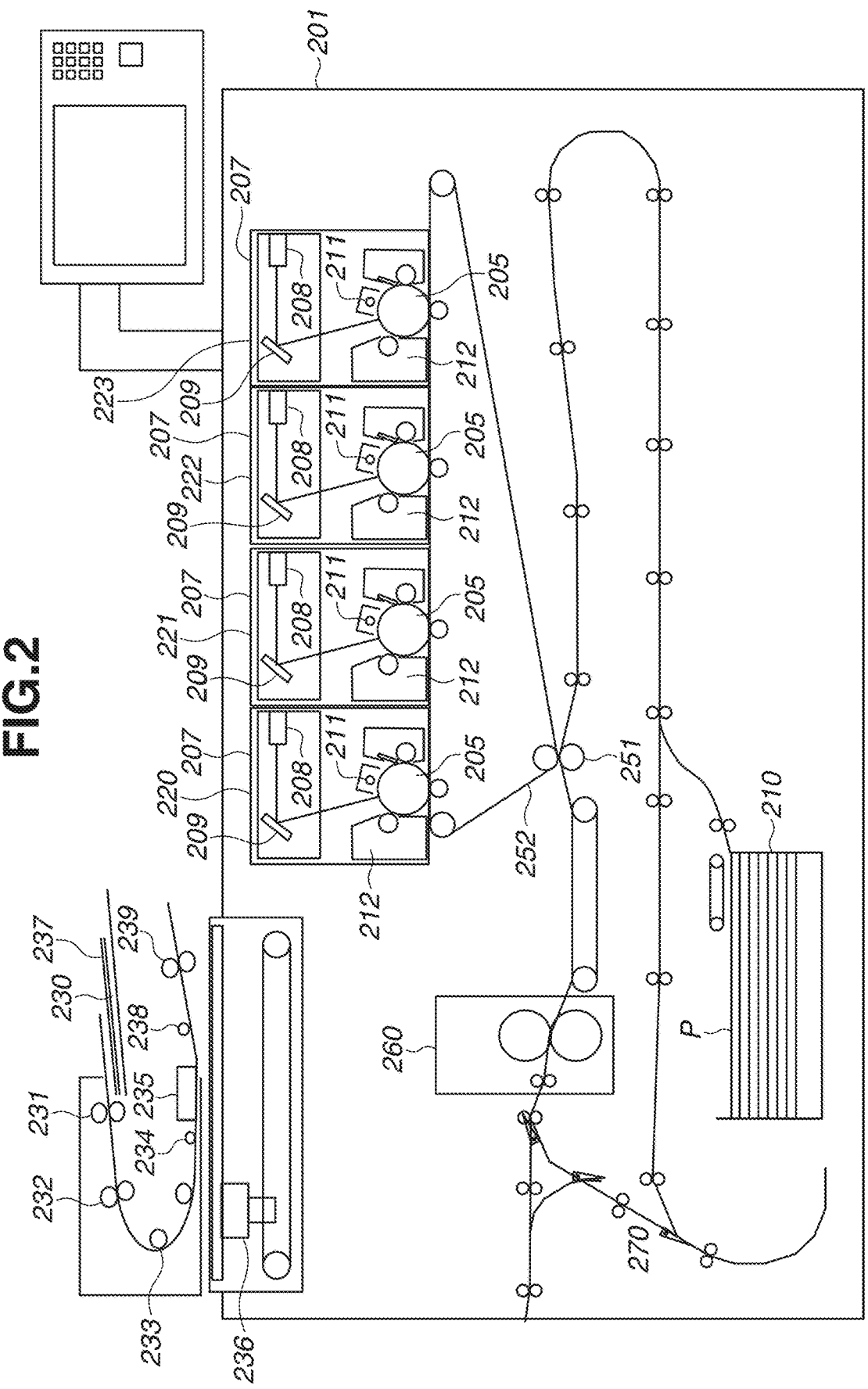
FIG. 2 is a schematic diagram illustrating an image forming apparatus including the image processing apparatus.

FIG. 2 is a cross-sectional diagram illustrating a structure of the image forming apparatus 100 according to the present exemplary embodiment. The image forming apparatus 100 includes a housing 201 as illustrated in FIG. 2. The housing 201 contains each mechanism for configuring an engine unit, an engine control unit that controls each printing process processing (e.g., paper feeding processing) by each mechanism, and a control board storage portion that stores a printer controller.

The image reading unit 130 includes an original document tray 230, a pickup roller 231, a conveyance roller 232, a roller 233, a light source 234, a second reading unit 235, a discharge roller 238, and a first reading unit 236. Original documents 237 stacked on the original document tray 230 are sent one by one to a reading path by the pickup roller 231. The original document 237 picked up by the pickup roller 231 is conveyed in a direction of the path via the conveyance roller 232. The original document 237 arrives at a reading position via the path, and image information added to the front side of the original document 237 is read by the light source 234 and the first reading unit 236, together with image information at an end portion of the original document 237. A white member is disposed at a position facing the first reading unit 236, and the first reading unit 236 performs reading when the original document passes this position. The first reading unit 236 is a reader to be used also for pressing plate reading. Afterward, when the original document 237 arrives at a reading position of the second reading unit 235, the second reading unit 235 reads image information on the back side of the original document 237. A white member is disposed at a position facing the second reading unit 235, and the second reading unit 235 performs reading when the original document 237 passes this position. The second reading unit 235 includes, for example, a contact image sensor (CIS). Afterward, the original document 237 is discharged by a discharge roller 239.

The information of the front side image and the back side image of each of the original documents 237 in a group stacked on the original document tray 230 is read by one conveyance, by repeating the above-described operation.

The example in which both sides of the original document are read in one conveyance is described as a desirable example, but it is not limited thereto. A reader including a reverse conveyance mechanism may be used if this reader can read both sides of the original document.

Each mechanism for configuring the engine unit is as follows. An optical processing mechanism forms an electrostatic latent image on a photosensitive drum 205 by laser beam scan, visualizes the formed electrostatic latent image, performs multiple transfer of the visualized images to an intermediate transfer member 252, and further transfers a color image formed by the multiple transfer to a sheet P as a toner image. A fixing processing mechanism fixes the toner image on the sheet P, a feed processing mechanism feeds the sheet P, and a conveyance processing mechanism conveys the sheet P.

The optical processing mechanism includes a laser driver for switching on/off of a laser beam emitted from a semiconductor laser (not illustrated) based on image data supplied from the controller 110, at a laser scanner unit 207. The laser beam emitted from the semiconductor laser is deflected to a scanning direction by a rotating polygon mirror 208. The laser beam deflected to a main-scanning direction is guided to the photosensitive drum 205 via a reflection polygon mirror 209, and exposes the photosensitive drum 205 to the laser beam in the main-scanning direction. Meanwhile, an electrostatic latent image is formed on the photosensitive drum 205 charged by a primary charger 211 and subjected to scanning exposure by the laser beam, and the formed electrostatic latent is visualized as a toner image by toner supplied by a developing device 212 to be described below. Subsequently, the toner image visualized on the photosensitive drum 205 is transferred (primarily transferred) onto the intermediate transfer member 252 applied with a voltage inverse to the toner image. In forming a color image, images of the respective colors are sequentially formed on the intermediate transfer member 252 by a yellow (Y) station 220, a magenta (M) station 221, a cyan (C) station 222, and a black (K) station 223. As a result, a full color visible image is formed on the intermediate transfer member 252.

Next, the sheet P fed from a storage 210 for storing transfer materials is conveyed, the conveyed sheet P is pressed against the intermediate transfer member 252 by a transfer roller 251, and simultaneously, a bias inverse to the toner is applied to the transfer roller 251. The visible image formed on the intermediate transfer member 252 is thereby transferred onto the sheet P synchronously conveyed in a conveying direction (a sub-scanning direction) of the sheet P by the feed processing mechanism (secondary transfer).

The sheet P after the secondary transfer passes through a fixing unit 260, so that the toner transferred onto the sheet P is melted by heating, and thereby fixed onto the sheet P as an image. In a case of two-sided print, the sheet P is reversed by a reversing unit 270 after passing therethrough, and guided to the transfer portion again, so that the back side image is transferred onto the sheet P. Afterward, the toner image on the sheet P is fixed by heating while the sheet P passes through the fixing unit 260 in a manner similar to that described above, and then discharged to the outside of the printer (image forming apparatus 100), and this completes the print process.

<Sheet Library>

Sheets to be used for printing in the image forming apparatus 100 are managed by an operator, using a database called a sheet library. The sheet library is stored in the HDD 115 or the RAM 113, and read out/written into by each software module as appropriate. A configuration of the sheet library will be described in detail below with reference to FIG. 5.

FIG. 3 is a diagram schematically illustrating an interface screen for the operator to perform operations such as editing of the sheet library in the print system according to the present exemplary embodiment. A sheet library edit screen 300 is the entire interface screen displayed on the console panel 120 by the CPU 114.

A sheet list 310 displays a list of sheets stored in the sheet library. In the sheet list 310, sheet attributes indicated by columns 311 to 315 are presented for each sheet to the operator, as additional information. The column 311 represents a sheet name of each sheet. The sheet name is a name designated by the operator or the like so as to distinguish the sheets from each other. The column 312 and the column 313 represent a sub-scanning direction sheet length and a main-scanning direction sheet length, respectively, of each sheet. The column 314 represents the basis weight of each sheet. The column 315 represents surface property of each sheet. The surface property is an attribute representing a physical property of a sheet front side, and examples of the surface property include "coated" meaning a front side coated to increase glossiness, and "embossed" meaning an uneven front side. The operator can select any sheet by touching a portion where the sheet is displayed in the sheet list 310, on the console panel 120. The selected sheet is highlighted (reversed display). In FIG. 3, a state where "XYZ-manufactured paper color 81" is selected is illustrated as an example. In a case where the number of sheets recorded in the sheet library is greater than the number of sheets that can be displayed in the sheet list 310 at a time, a scroll bar 317 is used. The operator can select any sheet by operating the scroll bar 317.

An add new button 320 is used to add a new sheet to the sheet library. An edit button 321 is used to edit the sheet attribute of the sheet selected in the sheet list 310. When the add new button 320 or the edit button 321 is pressed, an interface screen illustrated in FIG. 4 appears. A delete button 322 is used to delete the sheet selected in the sheet list 310 from the sheet library. A printing position adjustment button 323 is used to adjust a printing position with respect to the sheet selected in the sheet list 310.

<Editing Interface for Sheet Library>

FIG. 4 is a diagram schematically illustrating an interface screen for the operator to edit a sheet attribute in the print system according to the present exemplary embodiment. An interface screen 400 is the entire interface screen displayed on the console panel 120 by the CPU 114.

Text boxes 401 to 404 are used to input sheet attributes, i.e., the sheet name, the sub-scanning direction sheet length, the main-scanning direction sheet length, and the basis weight, respectively. The sheet attributes can be input into the text box by a software keyboard (not illustrated) or a numeric keypad included in the console panel 120. A combo box 405 is used to designate the surface property of a sheet. In the combo box 405, one surface property can be designated from a list of surface properties that are registered beforehand and can be supported by the image forming apparatus 100.

When an end edit button 420 is pressed, the sheet attributes input at that time is determined and stored into the sheet library. Afterward, the interface screen 400 is closed and the sheet library edit screen 300 is displayed again. When a cancel button 421 is pressed, the sheet attribute editing processing is stopped, the interface screen 400 is closed, and the sheet library edit screen 300 is displayed again.

<Content of Sheet Library>

FIG. 5 is a table representing the sheet library stored in the HDD 115 or the like. A schematic diagram is used for the sake of description, but the sheet library is actually stored in a form of digital information such as Extensible Markup Language (XML) or Comma Separated Value (CSV).

Sheet information 501 to sheet information 508 each represent a sheet registered in the sheet library.

Columns 511 to 515 represent sheet attributes designated by the operator, for each sheet. The column 511 represents a sheet name. The columns 512 to 515 represent sheet attributes indicating the physical property of a sheet, i.e., a sub-scanning direction sheet length, a main-scanning direction sheet length, a basis weight, and a surface property, respectively.

Columns 520 and 521 represent a printing position shift amount on the front side and that on the back side, respectively, of each sheet. The printing position shift amount represents the amount of a positional shift from an ideal printing position, and is composed of items of a lead position, a side position, a main-scanning magnification, and a sub-scanning magnification, in the present exemplary embodiment. In actual printing, the image forming apparatus 100 makes an adjustment based on these items of the printing position shift amount to achieve printing at the ideal printing position (i.e., an adjustment to cancel the printing position shift amount), and performs printing based on the adjustment. The lead position and the side position represent a printing position shift amount in the sub-scanning direction and a printing position shift amount in the main operation direction, respectively, with respect to the sheet. The lead position is adjusted by changing a printing start position of an image starting from the leading edge of a sheet in the sheet conveying direction, and the side position is adjusted by changing a printing start position of the image starting from the left edge of the sheet in the sheet conveying direction. The sub-scanning direction magnification represents a shift of the image length (a magnification with respect to an ideal length) in the sub-scanning direction. The main-scanning direction magnification represents a shift of the image length (a magnification with respect to an ideal length) in the main-scanning direction. Further, although it is not illustrated in FIG. 5, a skew degree represents a parallelism degree for any one side, a trapezoidal degree represent a parallelism degree between a leading end side and a trailing end side of an image printed on a sheet, and a squareness represents a rectangular degree of an image printed on a sheet.

Each of these printing position shift amounts is calculated by printing an adjustment chart in which predetermined marks are arranged and detecting the positions of the marks on the printed adjustment chart. An example of the adjustment chart will be described with reference to FIG. 6. The initial value for each item of these printing position shift amounts is 0, and the initial value is used in a case where new sheet information has just been registered on the sheet library, and in a case where the printing position adjustment is not performed even though a sheet is registered.

<Contents of Printing Position Adjustment Chart and Measurement>

Figure 6:
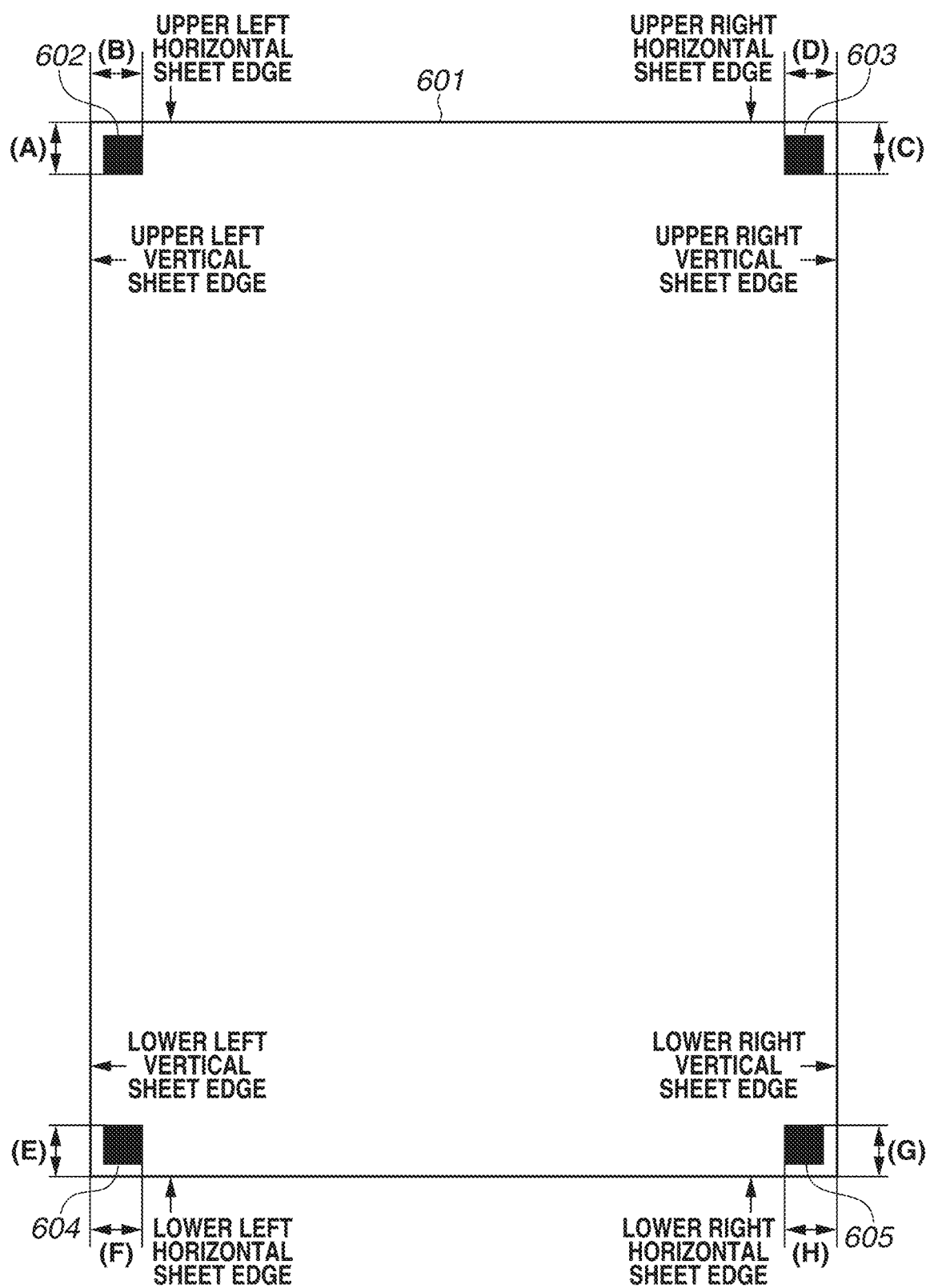
FIG. 6 is a schematic diagram illustrating a printing position adjustment chart.

FIG. 6 is a diagram schematically illustrating an example of the adjustment chart to be used in the printing position adjustment. The adjustment chart is printed based on an instruction of the CPU 114, after the start of the printing position adjustment.

A chart original document 601 represents the printed adjustment chart. Marks 602 to 605 are printed at specific positions of the adjustment chart. These marks are printed at the four corners of each of the front side and the back side of the adjustment chart, i.e., at eight places in total, and the images are placed to be printed at positions with fixed distances from the edges of the four sheet corners if the printing positions are ideal positions. The printing position shift amount is determined by measuring the position from each of the edges of the four sheet corners on the adjustment chart.

In the present exemplary embodiment, portions indicated by distances A to H in FIG. 6 are measured. The distances A to H each represent a distance from the corresponding one of the marks 602 to 605 to the closest sheet edge, and a distance of 10 mm is predefined for each of the distances A to H in the present exemplary embodiment.

<Operation of Printing Position Measurement Unit>

The method of calculating the above-described distances A to H will be described with reference to a flowchart in FIG. 8. For the positional relationship between an upper left vertical sheet edge, an upper left horizontal sheet edge, an upper right vertical sheet edge, an upper right horizontal sheet edge, a lower left vertical sheet edge, a lower left horizontal sheet edge, a lower right vertical sheet edge, and a lower right horizontal sheet edge in the flowchart, refer to the schematic diagram in FIG. 6.

In step S801, the CPU 114 acquires a read image of the adjustment chart via the image reading unit 130. The image reading unit 130 may be an external reader such as an automatic document feeder (ADF), or may be a reader installed in a printer, such as an in-line sensor.

Figure 10:
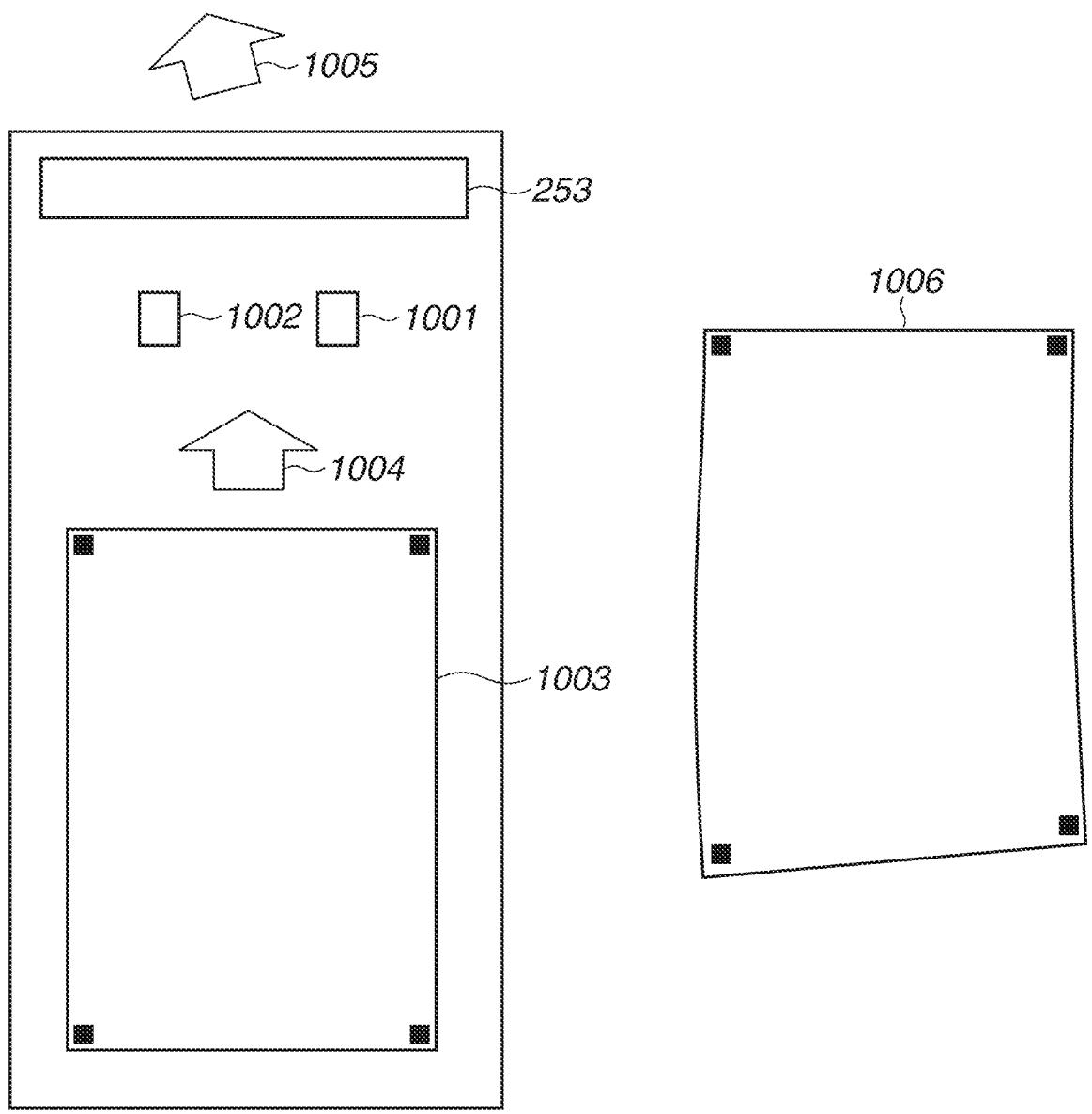
FIG. 10 is a diagram illustrating a reader having an automatic document feeder (ADF) involving paper conveyance.

In the present exemplary embodiment, reading by an ADF that conveys a sheet with two left and right rollers will be described as an example. When a sheet is conveyed using the rotation of the conveyance roller 232 illustrated in FIG. 2, there may be a case where a plurality of rollers is disposed on the left and right, depending on the sheet size thereof and the torque of the roller. FIG. 10 illustrates this example. FIG. 10 is a plan view of the image reading unit 130, and the conveyance roller 232 in the cross-sectional view in FIG. 2 corresponds to two conveyance rollers 1001 and 1002 in FIG. 10. Using these rollers, an adjustment chart 1003 is conveyed in a direction indicated by an arrow 1004. In this process, it may be desirable for these two rollers 1001 and 1002 to rotate at the same speed, in order to convey the adjustment chart 1003 in parallel. If the roller diameters vary, a speed difference between the left and right roller peripheries occurs, thereby making the parallel conveyance difficult. In FIG. 10, for example, in a case where the diameter of the roller 1001 is larger than the diameter of the roller 1002, the speed of the sheet passing through the roller 1001 increases, so that the sheet is conveyed while bending to a leftward direction indicated by an arrow 1005, and as a result, a distorted image is acquired by the second reading unit 235. An image 1006 represents the acquired image in the distorted state. The upper and lower edges of the sheet remain horizontal at the start of reading, but the right side gradually shrinks due to the speed difference, and the difference from the left side increases. As a result, the parallelism between the upper edge and the lower edge is lost. The following processing will be described assuming that the thus acquired image whose upper and lower edges are not parallel is used.

In step S802, the CPU 114 acquires the position of each of the marks 602 to 605 from the read image. The mark position is expressed as two-dimensional coordinates in a horizontal direction (x) and a vertical direction (y) of the scanned image, and the upper left coordinates are expressed as the origin point (0,0). The mark position may be expressed as the barycentric coordinates of the mark or may be calculated with subpixel accuracy. Further, the processing of detecting the mark may be performed using a pattern matching method.

In step S803, the CPU 114 acquires the sheet size of the adjustment chart from the sheet library edit screen 300. Specifically, the CPU 114 acquires the sub-scanning direction sheet length (mm) in the column 312 and the main-scanning direction sheet length (mm) in the column 313.

In step S804, the CPU 114 detects the upper left vertical sheet edge and the upper right vertical sheet edge. The information of these sheet edges is used to calculate the distance B and the distance D. The details of this processing will be described below.

In step S805, the CPU 114 detects the lower left vertical sheet edge and the lower right vertical sheet edge. The information of these sheet edges is used to calculate the distance F and the distance H. The details of this processing is similar to that in step S804.

In step S806, the CPU 114 detects the upper left horizontal sheet edge and the lower left horizontal sheet edge. The information of these sheet edges is used to calculate the distance A and the distance E. The details of this processing will be described below.

In step S807, the CPU 114 detects the upper right horizontal sheet edge and the lower right horizontal sheet edge. The information of these sheet edges is used to calculate the distance C and the distance G. The details of this processing is similar to that in step S806.

In step S808, the CPU 114 calculates the mark relative positions from the above-described eight detected sheet edges. In this processing, the distances A to H are calculated by calculating the normal line distance from the marker center coordinates to a linear equation ($\rho = x \cos \theta + y \sin \theta$) of each of the sheet edges.

<Vertical Sheet Edge Detection Processing>

The processing of detecting the vertical sheet edges in step S804 and step S805 will be described in detail with reference to a flowchart in FIG. 11.

Figure 12:
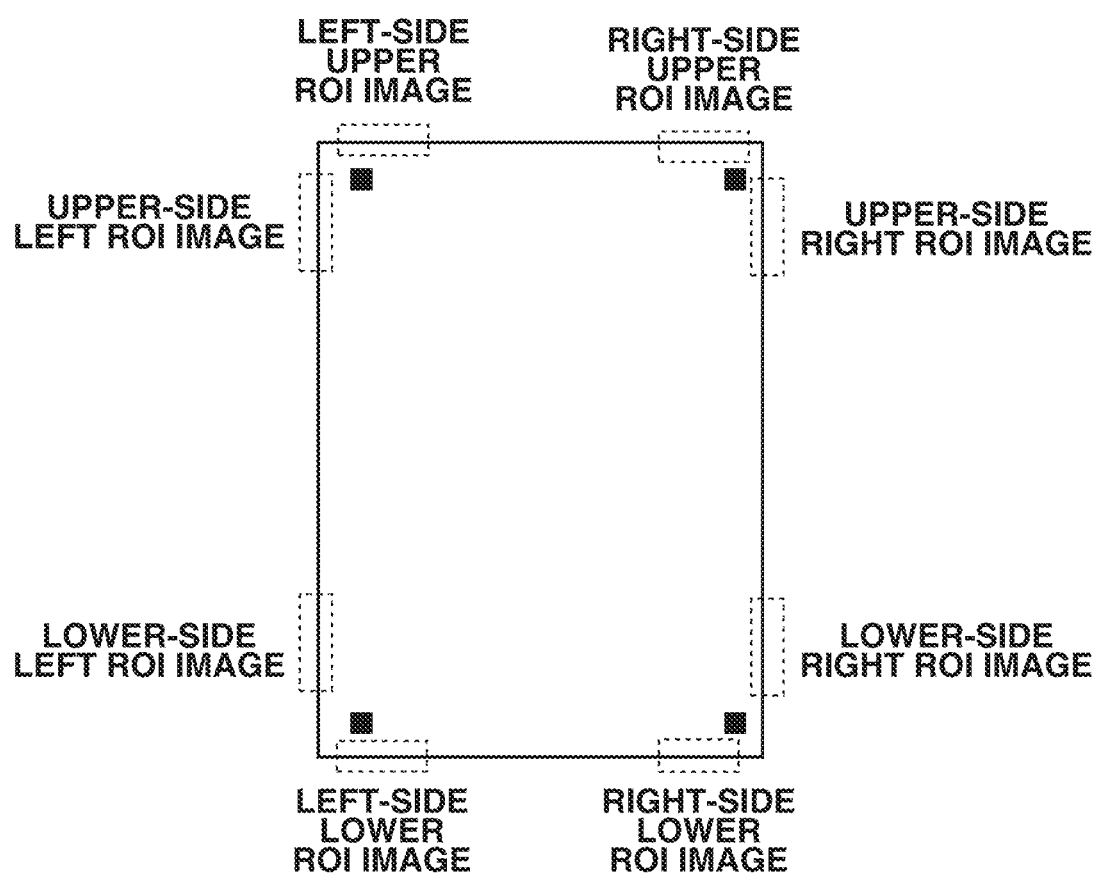
FIG. 12 is a diagram illustrating a positional relationship between upper, lower, left, and right region of interest (ROI) images.

In step S1101, the CPU 114 acquires left and right ROI (region of interest) images (partial images) based on the mark positions acquired in step S802. FIG. 12 is a diagram schematically illustrating the positional relationship between the left ROI image and the right ROI image in a case where the upper left vertical sheet edge and the upper right vertical sheet edge are detected. In the present exemplary embodiment, an area having a width of 0.5 mm and a length of 1.7 mm with 1.0 mm to the left of and 1.0 mm down from the center coordinates of the upper left mark being a central point is extracted as the left ROI image. Further, an area having a width of 0.5 mm and a length of 1.7 mm with 1.0 mm to the right of and 1.0 mm down from the center coordinates of the upper right mark being a central point is extracted as the right ROI image. The left and right ROI images in a case where the lower left vertical sheet edge and the lower right vertical sheet edge are extracted are acquired using a similar method.

In step S1102, the CPU 114 applies an edge detection filter to each of the left and right ROI images acquired n step S1101. In the present exemplary embodiment, the following kernel k is used as the edge detection filter.

$$k = \begin{bmatrix} -2 & -1 & 6 & -1 & -2 \\ -2 & -1 & 6 & -1 & -2 \\ -4 & -2 & 12 & -2 & -4 \\ -2 & -1 & 6 & -1 & -2 \\ -2 & -1 & 6 & -1 & -2 \end{bmatrix} \quad (1)$$

The edge detection filter is not limited to the kernel k. The edge detection filter may be a horizontal Laplacian filter or a differential filter. In the following description, an image after the edge detection filter is applied will be described as an image $I_e(x, y)$, where x and y are the indexes of coordinates.

In step S1103, the CPU 114 detects a plurality of both sheet edge candidates from the image after the edge detection filter is applied. The details of this processing will be described below.

In step S1104, the CPU 114 determines the optimum pair from the plurality of sheet edge candidates. The details of this processing will be described below.

<Sheet Edge Candidate Extraction Processing>

Figure 13:
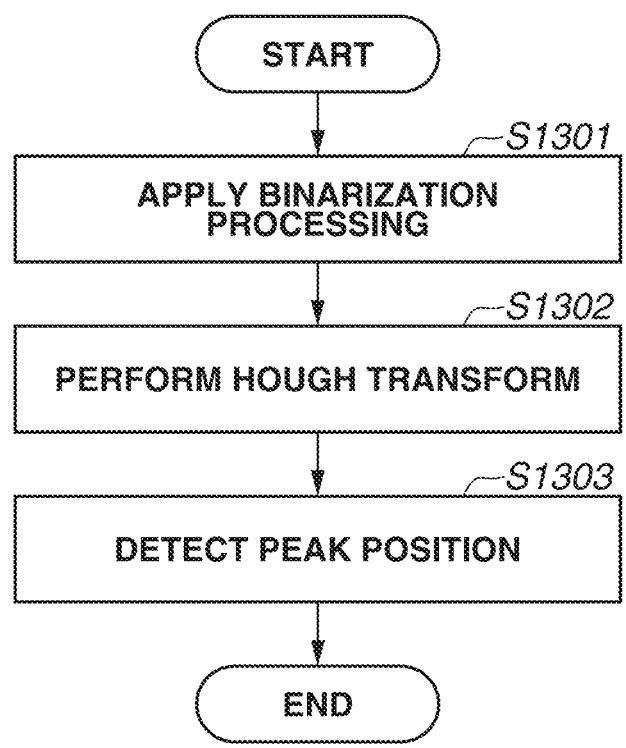
FIG. 13 is a flowchart illustrating an operation of sheet edge candidate extraction processing.

The sheet edge candidate extraction processing performed in step S1103 will be described in detail with reference to a flowchart in FIG. 13.

In step S1301, the CPU 114 applies binarization processing to the image $I_e(x, y)$ calculated in step S1102 and thereby acquires a binary image $I_b(x, y)$. Specifically, the binary image $I_b(x, y)$ can be calculated by the following equation.

$$I_b(x, y) = \begin{cases} 1 & \text{if } I_e(x, y) > th \\ 0 & \text{if } I_e(x, y) \leq th \end{cases} \quad (2)$$

where th is a threshold, and may be, for example, a fixed value of 128, or may be dynamically determined from an image, using Otsu's method.

In step S1302, the CPU 114 performs Hough transform for the acquired binary image $I_b(x, y)$. The Hough transform is processing of comprehensively detecting a straight line forming a predetermined angle θ from an image, by expressing the straight line by an equation ($\rho = x_i \cos θ + y_i \sin θ$). The operation of the Hough transform will be described.

In the Hough transform, at first, all pairs ($x_i$, $y_i$) of coordinates x and y satisfying $I_b(x, y)=1$ are acquired (0≤i≤M). Next, a $\rho_{ij}$ value is calculated as follows for each of the pairs ($x_i$, $y_i$).

$$\rho_{ij} = x_i \cos θ_j + y_i \sin θ_j \quad (3)$$

θj (0≤i≤N) is a predetermined value, and in the present exemplary embodiment, θ is a value in a range of 88° to 92° in increments of 0.5° (θ0=88, θ1=88.5, . . . , θ7=92). The obtained (θj, $\rho_{ij}$) represents the straight line of an angle θj passing through the point ($x_i$, $y_i$).

Next, a Hough table $H(\rho, θ)$ is calculated by counting all the obtained pairs (θj, $\rho_{ij}$). Specifically, the Hough table H is expressed as follows.

$$H(θ, \rho) = \sum_{i,j} E_{\rho_{ij}, θ_j} \quad (4)$$

Here, Em, n is a matrix having N rows and (max φ columns satisfying the following equation.

$$E_{m,n}(x, y) = \begin{cases} 1 & x = m \text{ and } y = n \\ 0 & \text{otherwise} \end{cases} \quad (5)$$

FIG. 14 illustrates an example of the calculated Hough table. The value of a cell (θ, φ of the Hough table represents how many points are on the straight line $\rho = x \cos θ + y \cos θ$ within the binary image $I_b(x, y)$. For example, the value of a cell (θ=89°, ρ=2) in FIG. 14 is 219, which is a large value. A straight line defined by the cell (θ=89°, ρ=2) can be determined to be within the image. Meanwhile, the value of a cell (θ=92°, ρ=2) is 0, and therefore indicates that a straight line defined by the cell (θ=92°, ρ=2) is not within the image.

In step S1303, the CPU 114 detects a peak position from the Hough table calculated in step S1302. In the present exemplary embodiment, a point that satisfies $H(θ,\rho) \geq H(θ,\rho+1)$, $H(θ,\rho) \geq H(θ+1,\rho)$, $H(θ,\rho) \geq H(θ-1,\rho)$, $H(θ,\rho) \geq H(θ,\rho-1)$, and $H(θ,\rho) > th\_hough$ is detected as the peak value. Here, th_hough is a threshold for determining whether this Hough table value is noise, and, in the present exemplary embodiment, th_hough is 140. For example, a cell (θ=91°, ρ=5) and the cell (θ=89°, ρ=2) are two candidates for the peak value detected for the example in FIG. 14.

Figure 15A:
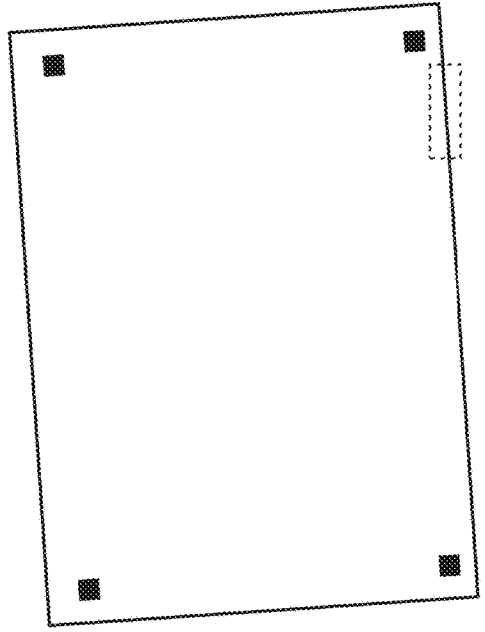
FIG. 15A is a schematic diagram illustrating an ROI image and a plurality of sheet edge detection results.
Figure 15B:
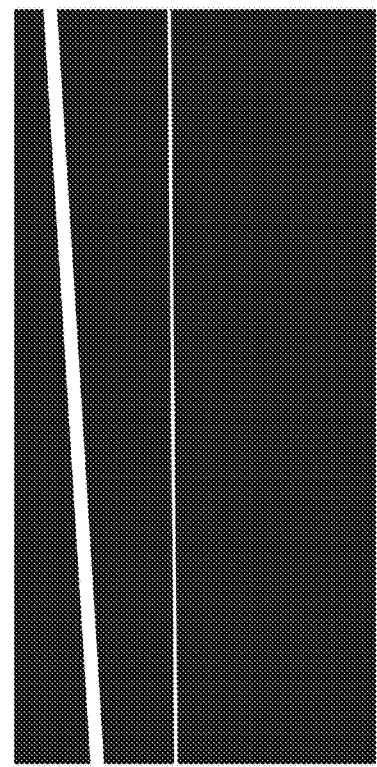
FIG. 15B is a schematic diagram illustrating a binary image of an upper-side right ROI image.

As described above, the plurality of sheet edge candidates can be extracted from one ROI image in the sheet edge candidate extraction processing. FIGS. 15A and 15B are schematic diagrams illustrating an example in which a plurality of sheet edge candidates is detected. FIG. 15A is a schematic diagram illustrating a scanned image and the right ROI image. This scanned image is a result of reading the sheet surface askew because of an inclination occurred in the conveyance. FIG. 15B is a schematic diagram illustrating the binary image Ib(x, y) when this processing is applied to the upper-side right ROI image of this scanned image. A black pixel of the binary image Ib(x, y) indicates that no edge is present at the pixel position of this pixel, and a white pixel indicates that an edge is present at the pixel position of this pixel. For this scanned image, two sheet edge candidates (a plurality of edges) are calculated as illustrated in FIG. 15B. An edge on the left side in FIG. 15B is formed by the shadow of the sheet edge, and this edge corresponds to a sheet edge candidate at the cell (θ=89°, ρ=2) in the Hough table in FIG. 14. This edge inclines from the vertical direction by one degree, because of a skew in the scan. On the other hand, the sheet edge candidate on the right side in FIG. 15B is a sheet edge candidate detected by mistake because of a reader streak, and corresponds to the cell (θ=91°, ρ=5) in the Hough table in FIG. 14. The reader streak is always detected as a vertical streak, irrespective of the amount of an inclination of the original document. The plurality of sheet edge candidates detected by this processing is narrowed down to one optimum pair (one pair of edges) by the following optimum sheet edge pair determination processing.

<Optimum Sheet Edge Pair Determination Processing>

The optimum sheet edge pair determination processing in step S1104 will be described in detail with reference to a flowchart in FIG. 16.

In step S1601, the CPU 114 determines whether the processing in step S1602 to step S1604 is completed for all the sheet edge candidates. If the processing is not completed (NO in step S1601), the processing proceeds to step S1602. If the processing is completed (YES in step S1601), the processing proceeds to step S1605. For example, in a case where three left sheet edge candidates and five right sheet edge candidates are extracted in step S1103, this loop is repeated fifteen times in total.

In step S1602, the CPU 114 acquires a first sheet edge candidate ρL, θL. The first sheet edge candidate is, for example, the upper left vertical sheet edge candidate.

In step S1603, the CPU 114 acquires a second sheet edge candidate ρR, θR. The second sheet edge candidate is, for example, the upper right vertical sheet edge candidate.

In step S1604, the CPU 114 calculates a likelihood in consideration of the parallelism of the sheet edge pair and the paper size. In the present exemplary embodiment, the likelihood of the sheet edge pair is calculated by the following equation. The following equation indicates that the smaller the numeric value is, the higher the likelihood of this sheet edge pair is.

$$l = |psize - (\rho_R - \rho_L)\cos \theta_L * 25.4/ \text{dpi}| + \gamma \text{step}(|\theta_R - \theta_L| - \varepsilon) \quad (6)$$

Here, psize represents the standard value of the paper size. The sheet length in the sub-scanning direction is set at the time of the detection of the vertical sheet edge, and the sheet length in the main-scanning direction is set at the time of the detection of the horizontal sheet edge. Further, dpi is a scan resolution. Furthermore, step(x) is a step function that returns 1 when x>0, and returns 0 when x≤0. γ and ε are constants, and γ=1000 and ε=0.5 are used. A term (ρR−ρL) cos θL*25.4/dpi represents the measurement value of the sheet size determined based on the sheet edge candidate pair, and a term |psize−(ρR−ρL)cos θL*25.4/dpi| represents an error between the standard value and the measurement value.

Further, γ step(|θR−θL|−ε) is a penalty term based on the parallelism of the sheet. More specifically, no penalty is given when the difference between θR and θL is 0.5° or less, and 1000 penalties are given otherwise. In other words, no penalty is given if the absolute value of the difference between angles is lower than or equal to a threshold. In the present exemplary embodiment, the likelihood is calculated using the above-described equation, but the present disclosure is not limited thereto. For example, the minimum value of a numeric value calculated by subtracting a length in a predetermined direction of a paper size from the distance of the sheet edge candidate pair (distance between the edges, i.e., the difference between pieces of position information corresponding to the edges) may be used for the maximum likelihood sheet edge. In this case, the innermost sheet edge candidate with respect to the standard value of the paper size is selected as the maximum likelihood sheet edge.

In step S1605, the CPU 114 determines the most likely sheet edge pair (minimum value), as the maximum likelihood sheet edge pair.

Figure 17:
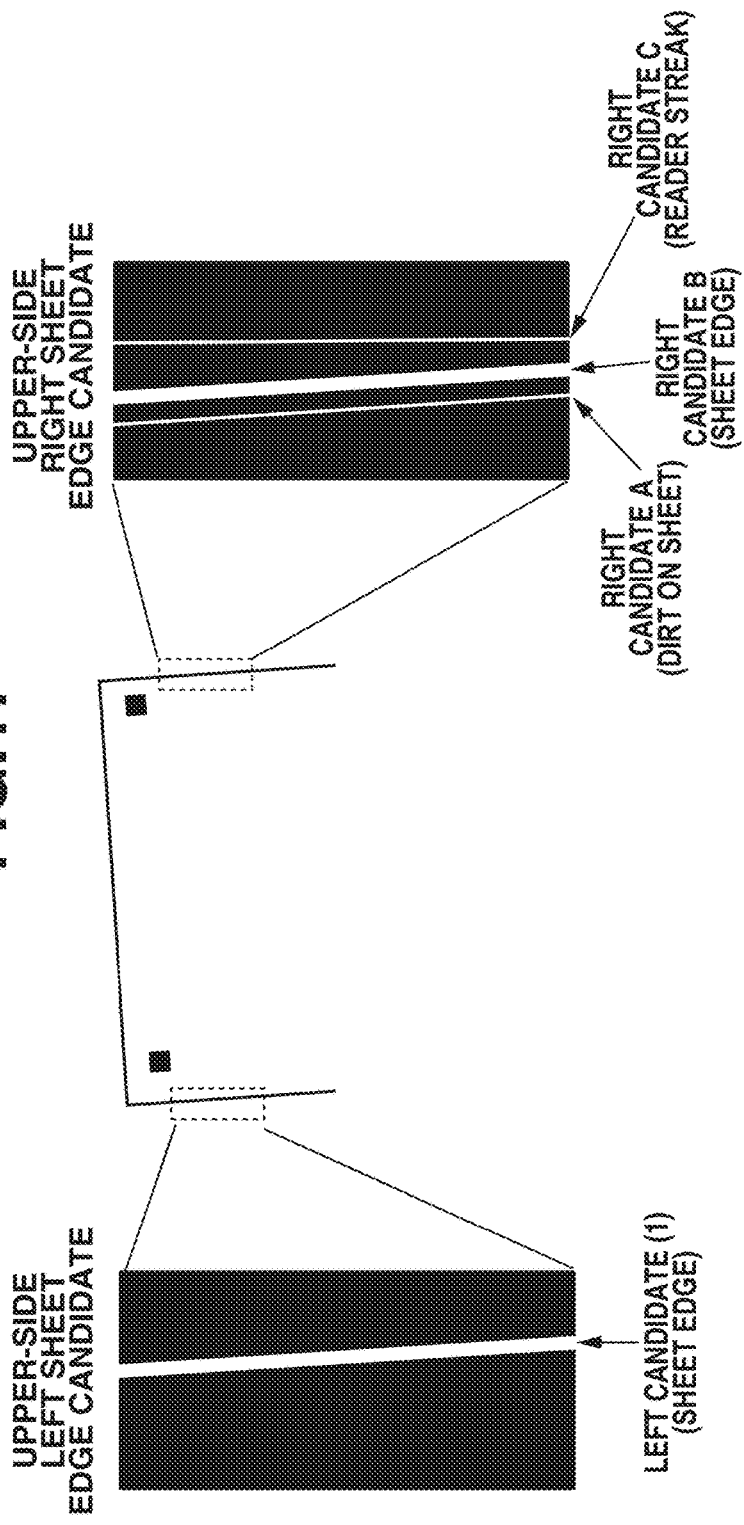
FIG. 17 is a schematic diagram illustrating an example of optimum pair determination processing for left and right sheet edges.

Specific operation in this processing will be described with reference to an example in FIG. 17. FIG. 17 illustrates, in an upper part thereof, the result of the sheet edge candidate extraction processing of detecting the upper-side right sheet edge and the upper-side left sheet edge for this scanned image. For the upper-side right sheet edge, three candidates of a right candidate A (dirt on a sheet), a right candidate B (sheet edge), and a right candidate C (reader streak) are extracted. On the other hand, for the left sheet edge, only one left candidate (1) (sheet edge) is extracted.

A table in the lower part of FIG. 17 indicates the calculated likelihood result and the determined sheet edge pair by the optimum sheet edge pair determination processing. In the table, the paper standard error represents the numeric value of the term |psize−(ρR−ρL)cos θL*25.4/dpi| in the equation (6), and the parallelism penalty indicates the value of the term γ step(|θR−θL|−ε). The likelihood score indicates the value defined by the equation (6). In the numeric value of the paper standard error, "left candidate (1)×right candidate C" corresponds to the least error. However, the right candidate C is the reader streak, is not parallel with the left candidate (1), and thus is not the optimum sheet edge candidate from the viewpoint of the parallelism. The right candidate A and the right candidate B are parallel with the left candidate (1), and thus "left candidate (1) x right candidate B" closest to the paper standard value is determined as the optimum sheet edge candidate pair.

<Horizontal Sheet Edge Detection Processing>

Next, the detection of the horizontal sheet edge that is a sheet edge in a direction orthogonal to the vertical sheet edge will be described. The processing of detecting the horizontal sheet edge performed in step S806 and step S807 will be described in detail with reference to a flowchart in FIG. 18.

In step S1801, the CPU 114 acquires upper and lower ROI images based on the mark positions acquired in step S802. FIG. 12 is the schematic diagram illustrating the positional relationship between the upper ROI image and the lower ROI image in a case where the upper left horizontal sheet edge and the lower left horizontal sheet edge are detected. In the present exemplary embodiment, an area having a width of 1.7 mm and a length of 0.5 mm with a central point located 1.0 mm to the right of and 1.0 mm up from the center coordinates of the upper left mark is extracted as the upper ROI image. Further, an area having a width of 1.7 mm and a length of 0.5 mm with a central point located 1.0 mm to the right of and 1.0 mm down from the center coordinates of the lower left mark is extracted as the lower ROI image. The upper and lower ROI images in a case where the upper right horizontal sheet edge and the lower right horizontal sheet edge are extracted are acquired using a similar method.

In step S1802, the CPU 114 applies an edge detection filter to each of the upper and lower ROI images acquired in step S1801. In the present exemplary embodiment, a differential filter for top and bottom is used as the edge detection filter, but the present disclosure is not limited thereto. The edge detection filter may be other type of filter such as a vertical Laplacian filter.

In step S1803, the CPU 114 detects a plurality of both sheet edge candidates from the image after the edge detection filter is applied. This processing is similar to that in step S1103.

In step S1804, the CPU 114 determines the optimum pair from the detected plurality of sheet edge candidates.

The basic flow of this processing is also similar to that described with reference to step S1104. The processing is performed as in the flow in step S1601 to step S1605 in FIG. 16. However, as described above, the parallelism between the upper and lower edges of the processing target image is not necessarily guaranteed, because of the roller speed difference. In this case, the equation (6) based on the parallelism in step S1604 described above does not hold. Thus, when the likelihood of the sheet edge pair is calculated from the first sheet edge candidate $\rho T$, $\theta T$ and the second sheet edge candidate $\rho B$, $\theta B$, an angular difference $\Delta\theta$ formed by the upper left vertical sheet edge and the upper right vertical sheet edge detected in step S804, and the lower left vertical sheet edge and the lower right vertical sheet edge detected in step S805, is used as a correction value. For example, in a case where the image is ideally acquired with edges in parallel, this angular difference is 0, when an angle determined by the upper left and the upper right is an upper angle $\theta 1$, and an angle determined by the lower left and the lower right is a lower angle $\theta 2$. However, in a case where there is a difference between these angles, e.g., in a case where the upper angle $\theta 1$ is 87° and the lower angle $\theta 2$ is 90°, the parallelism between the upper and lower edges is lost, and a shift of the upper and lower edges by 3° from the horizontal line is estimated from the angular difference $\Delta\theta=3°$. Accordingly, the equation (6) is transformed as follows.

$$l = |psize - (\rho_T - \rho_B)\cos\theta_{ave} * 25.4/\ dpi| + \gamma step\ (|\theta_T - \theta_B + \Delta\theta| - \varepsilon) \quad (7)$$

Here, $\theta ave$ is the average of angles determined by $(\theta T - \theta B)/2$.

The optimum pair of the upper and lower edges is determined by adding this angle correction value $\Delta\theta$ to the equation (7).

Figure 19:
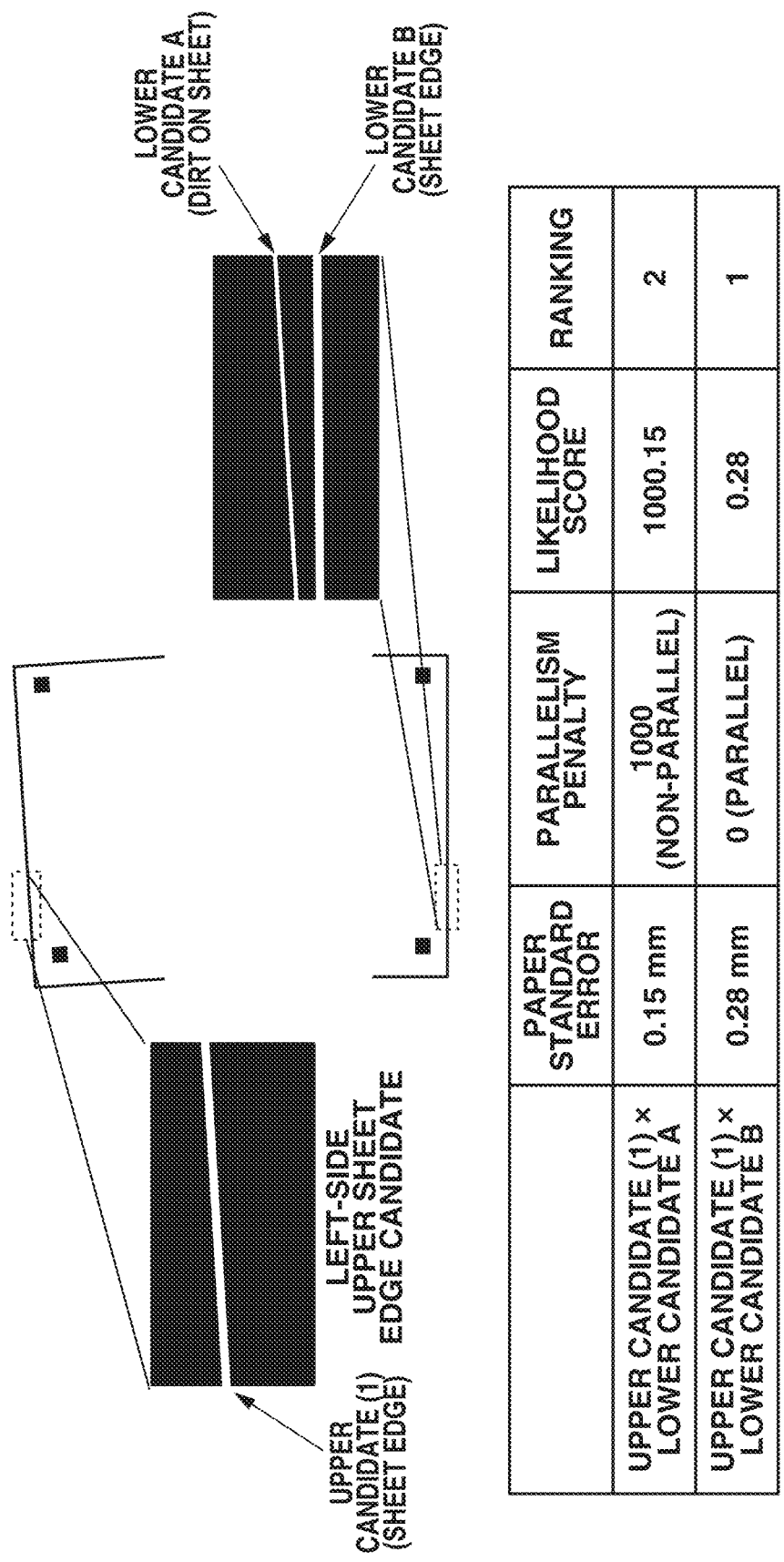
FIG. 19 is a schematic diagram illustrating an example of optimum pair determination processing for upper and lower sheet edges.

Specific operation in this processing will be described with reference to an example in FIG. 19. FIG. 19 illustrates, in an upper part thereof, the result of the sheet edge candidate extraction processing of detecting the left-side upper sheet edge and the left-side lower sheet edge for this scanned image. For the left-side lower sheet edge, two candidates of a lower candidate A (dirt on a sheet) and a lower candidate B (sheet edge) are extracted. On the other hand, for the left-side upper sheet edge, only one upper candidate (1) (sheet edge) is extracted.

A table in the lower part of FIG. 19 indicates the calculated likelihood result and the determined sheet edge pair by the optimum sheet edge pair determination processing. In the table, the paper standard error represents the numeric value of the term $|psize - (\rho R - \rho L)\cos\theta ave * 25.4/dpi|$ in the equation (7), and the parallelism penalty indicates the value of the term $\gamma\ step(|\theta T - \theta B + \Delta\theta| - \varepsilon)$. The likelihood score indicates the value defined by the equation (7). In a case where the sheet is fed with edges in parallel as in a normal situation, "upper candidate (1) x lower candidate A" corresponds to the least error. However, due to the correction based on the value of the angle $\Delta\theta$ determined from the left and right edges, the lower candidate A is not parallel with the upper candidate (1) and thus is not the optimum sheet edge candidate from the viewpoint of the parallelism, so that the lower candidate B is determined as the optimum sheet edge candidate pair.

<Use Sequence>

Figure 7:
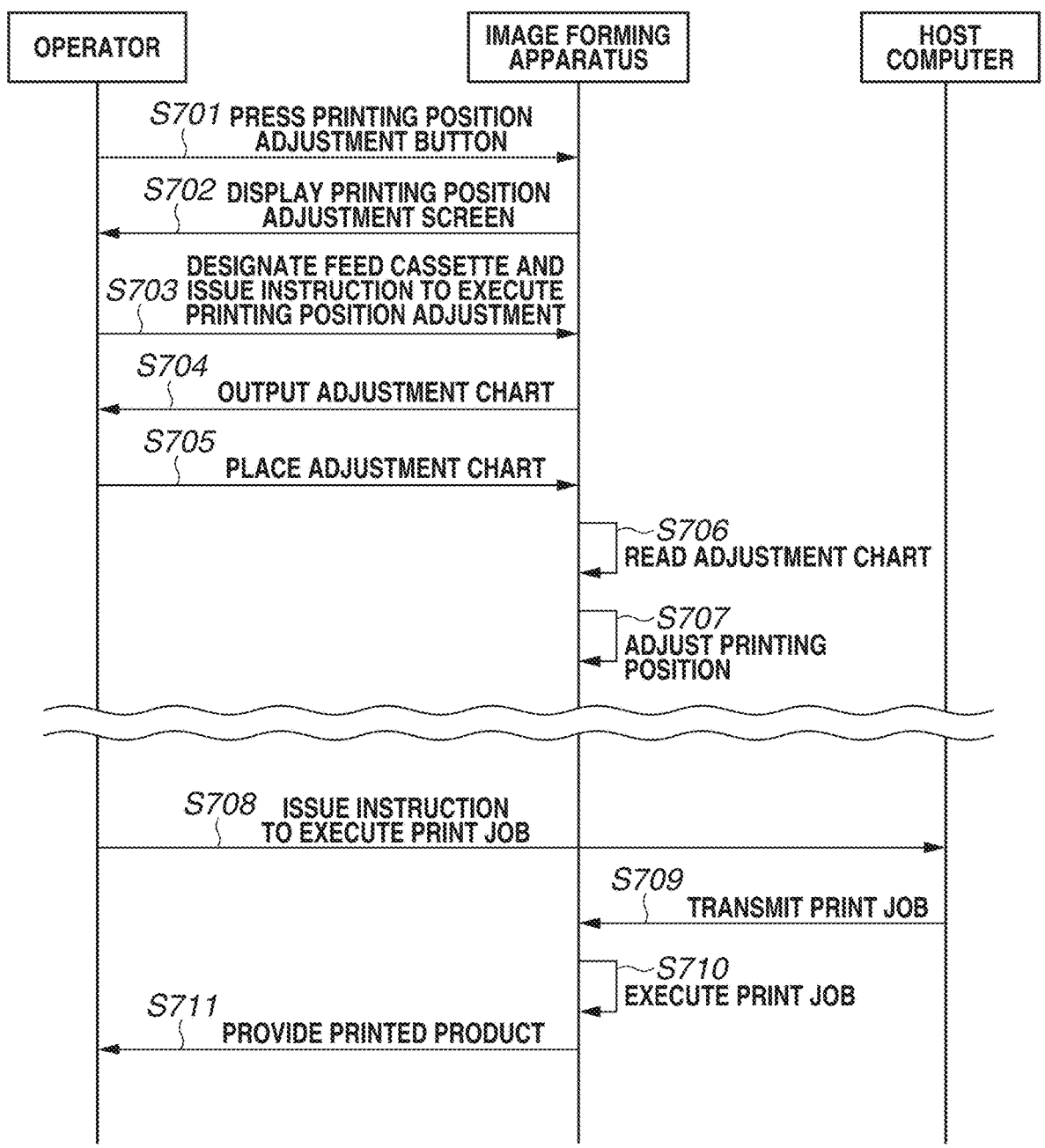
FIG. 7 is a sequence diagram illustrating a series of steps of processing.

FIG. 7 is a sequence diagram illustrating a series of steps of the processing in the present exemplary embodiment. In the present exemplary embodiment, the main exchange is carried out between the operator and the image forming apparatus 100. Here, the sequence begins in a state where the sheet library edit screen 300 is displayed.

First, in step S701, when the operator presses the printing position adjustment button 323, the image forming apparatus 100 determines to start a printing position adjustment. In step S702, the image forming apparatus 100 displays a printing position adjustment screen for designating a feed cassette, via the CPU 114.

Next, in step S703, the operator designates a feed cassette, and issues an instruction to execute the printing position adjustment processing.

Next, in step S704, the image forming apparatus 100 outputs the adjustment chart illustrated in FIG. 6, via the CPU 114.

Next, in step S705, the operator places the adjustment chart output in step S704, on the image reading unit 130.

Next, in step S706, the image forming apparatus 100 reads the adjustment chart placed on the image reading unit 130 and performs the printing position adjustment processing, via the CPU 114.

Next, in step S707, the image forming apparatus 100 executes the printing position adjustment via the CPU 114, i.e., the printing position adjustment processing in step S802 to step S808, thereby storing the printing position shift amount for each feed cassette into the sheet library.

In the present exemplary embodiment, the printing position adjustment is performed in this way. Then, the image is formed as follows, using the registered printing position shift amount.

Next, in step S708, the operator issues an instruction to execute a print job to the host computer 101.

Next, in step S709, the host computer 101 transmits the print job to the image forming apparatus 100.

Next, in step S710, the image forming apparatus 100 executes the print job. In this process, the printing position shift amount registered for the feed cassette is read out from the sheet library, and then used for the execution of the print job.

Next, in step S711, the image forming apparatus 100 provides a printed product generated in the execution of the print job.

<Remarks>

The above-described processing enables the operator to have the printing position shift amount calculated for each of the selected feed cassettes only by scanning the chart, and the front and back printing position adjustment to be achieved.

The method of detecting the plurality of sheet edge candidates and calculating the maximum likelihood sheet edge candidate pair based on the parallelism and the paper size is described above. According to the present exemplary embodiment, even in a situation where the luminance of a reader background and that of paper white are close and a situation where there is much noise, e.g., a reader streak occurs, the mark relative positions can be robustly detected. The front and back position adjustment can be accurately performed by adjusting the print position to offset the calculated mark relative position.

In addition, in a case where the parallelism between the leading edge and the rear edge of a sheet is lost because of uneven conveyance of the sheet, the mark relative positions can also be robustly detected, by using the angular difference when the left and right edges of the sheet are obtained, as the correction value.

In the present exemplary embodiment, the left and right ROI images and the upper and lower ROI images illustrated in FIG. 12 are described to be independent images not overlapping each other, but the ROI images are not necessarily limited to this type. A wider range, e.g., the four corners on the sheet including the markers may be clipped and used for the processing, as the ROI images common to the vertical sheet edges and the horizontal sheet edges.

In the first exemplary embodiment, the plurality of candidates is detected by the Hough transform for each of the opposed sheet edges, and the optimum pair is selected based on the paper size and the parallelism. However, the use of the Hough transform has such an issue that the accuracy of detecting the sheet edges is not high, although the plurality of candidates can be detected. Thus, in a second exemplary embodiment, the optimum sheet edge pair is detected, and subsequently, more detailed sheet edge estimation is performed, so that sheet edges are detected with higher accuracy. A configuration of a print system in the second exemplary embodiment is substantially identical to that in the first exemplary embodiment. Accordingly, components and steps identical to those of the first exemplary embodiment are assigned the same reference numerals as those of the first exemplary embodiment, and the detailed description thereof will be omitted. A point different from the first exemplary embodiment will be described.

<Vertical Sheet Edge Detection Processing>

Figure 20:
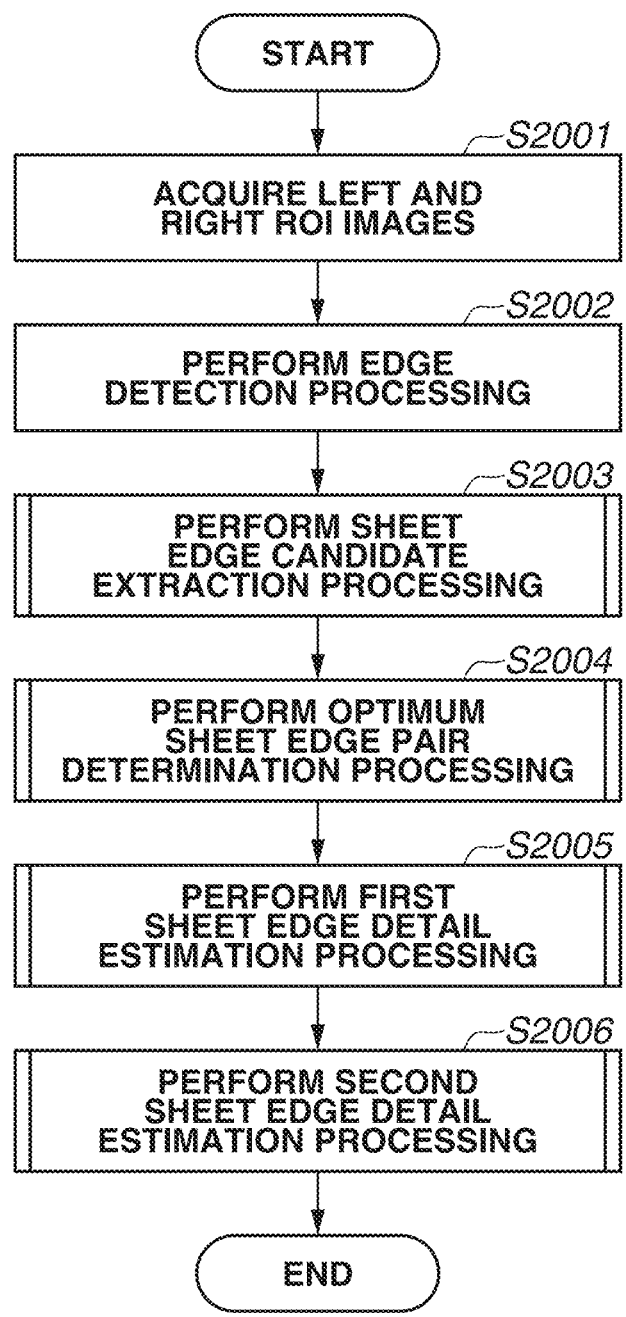
FIG. 20 is a flowchart illustrating an operation of vertical sheet edge detection processing according to a second exemplary embodiment.

Processing of detecting vertical sheet edges in step S804 and step S805 will be described in detail with reference to a flowchart in FIG. 20.

In step S2001, the CPU 114 acquires left and right ROI images based on mark positions acquired in step S802. This processing is similar to that of the first exemplary embodiment.

In step S2002, the CPU 114 applies an edge detection filter to each of the left and right ROI image acquired in step S2001. This processing is similar to that of the first exemplary embodiment.

In step S2003, the CPU 114 detects a plurality of both sheet edge candidates from the image after the edge detection filter is applied. This processing is similar to that of the first exemplary embodiment.

In step S2004, the CPU 114 determines the optimum pair from the detected plurality of sheet edge candidates. This processing is similar to that of the first exemplary embodiment.

In step S2005, the CPU 114 determines a more detailed sheet edge equation, based on the first sheet edge equation obtained in step S2004. The details of this processing will be described below.

In step S2006, the CPU 114 determines a more detailed sheet edge equation, based on the second sheet edge equation obtained in step S2004. The details of this processing will be described below.

<Sheet Edge Detail Estimation Processing>

Figure 21:
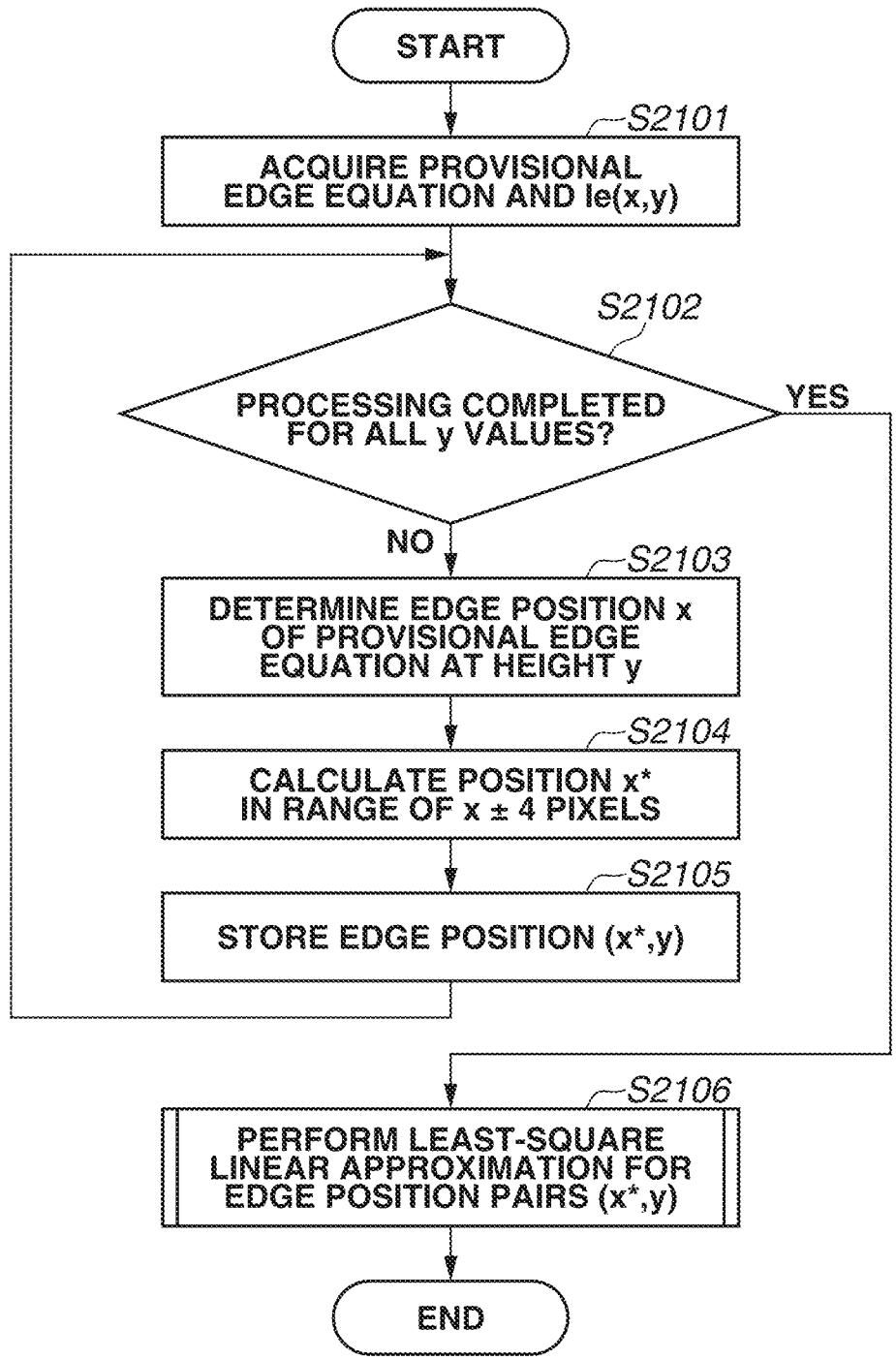
FIG. 21 is a flowchart illustrating an operation of sheet edge detail estimation processing.

The sheet edge detail estimation processing executed in step S2005 and step S2006 will be described in detail with reference to a flowchart in FIG. 21.

In step S2101, the CPU 114 acquires a coefficient (ρ, θ) of the sheet edge equation calculated in step S2004 and an image Ie(x, y) after the application of the edge detection filter calculated in S1102. In the following description, this coefficient is updated, so that a more detailed coefficient (ρ', θ') is calculated.

In step S2102, the CPU 114 determines whether the execution of the following processing is completed for all y values of this ROI image. If the processing is not completed (NO in step S2102), the processing proceeds to step S2103. If the processing is completed (YES in step S2102), the processing proceeds to step S2106. For example, in a case where the vertical size of the image Ie(x, y) is 200 pixels, the processing in step S2103 to step S2105 is repeated 200 times.

In step S2103, the CPU 114 determines an edge position x of the provisional edge equation at a height y. Specifically, the edge position x is calculated as x=(ρ−y sin θ)/cos θ.

In step S2104, the CPU 114 calculates a position x* at which an edge detection filter response value in a range of ±4 pixels (neighboring pixels) around the position x is maximum. Specifically, the position x* is calculated by the following linear approximate equation.

$$x* = \operatorname*{argmax}_{x-4 \leq u \leq x+4} I_e(u, y)$$

In step S2105, the CPU 114 stores the calculated edge position (x*, y) into a RAM 113.

In step S2106, the CPU 114 performs least-square linear approximation for the calculated plurality of edge position pairs (x*, y). In this way, a coefficient (ρ', θ') more accurate than the coefficient (ρ, θ) calculated in step S2004 is calculated.

<Horizontal Sheet Edge Detection Processing>

As with the above-described vertical sheet edge detection processing, sheet edge detail estimation processing is executed after the sheet edge candidate pair is determined based on Hough transform. Specifically, step S2005 and step S2006 are executed after the processing in step S1801 to step S1804 is executed.

<Remarks>

As described above, in the present exemplary embodiment, the more detailed sheet edge estimation is performed after the optimum sheet edge pair is detected. According to the present exemplary embodiment, it is possible to estimate the sheet edges with high accuracy, while considering the consistency with the parallelism of the sheet edges and the paper size.

In the first and second exemplary embodiments, the optimum sheet edge pair is determined from one image, based on the standard value of the sheet size. However, there is a case where the paper size on the scanned image does not agree with the standard value of the sheet size, for reasons such as the variation in speed of the conveyance roller and an error in sheet cutting. In the above-described exemplary embodiments, the optimum edge pair is detected based on the sheet size, and there is a case where registration adjustment is not normally performed if there is a difference between the sheet size on the read image and the standard value. Accordingly, in a third exemplary embodiment, sheet edges are detected after a plurality of sheets is printed and scanned for registration adjustment and a likely paper size is estimated. The position correction can be thereby robustly executed, even if there is a difference between the standard value of the paper size and the paper size of the read image. In the following description, only a part different from the first exemplary embodiment will be described.

<Operation of Printing Position Measurement Unit>

Figure 22:
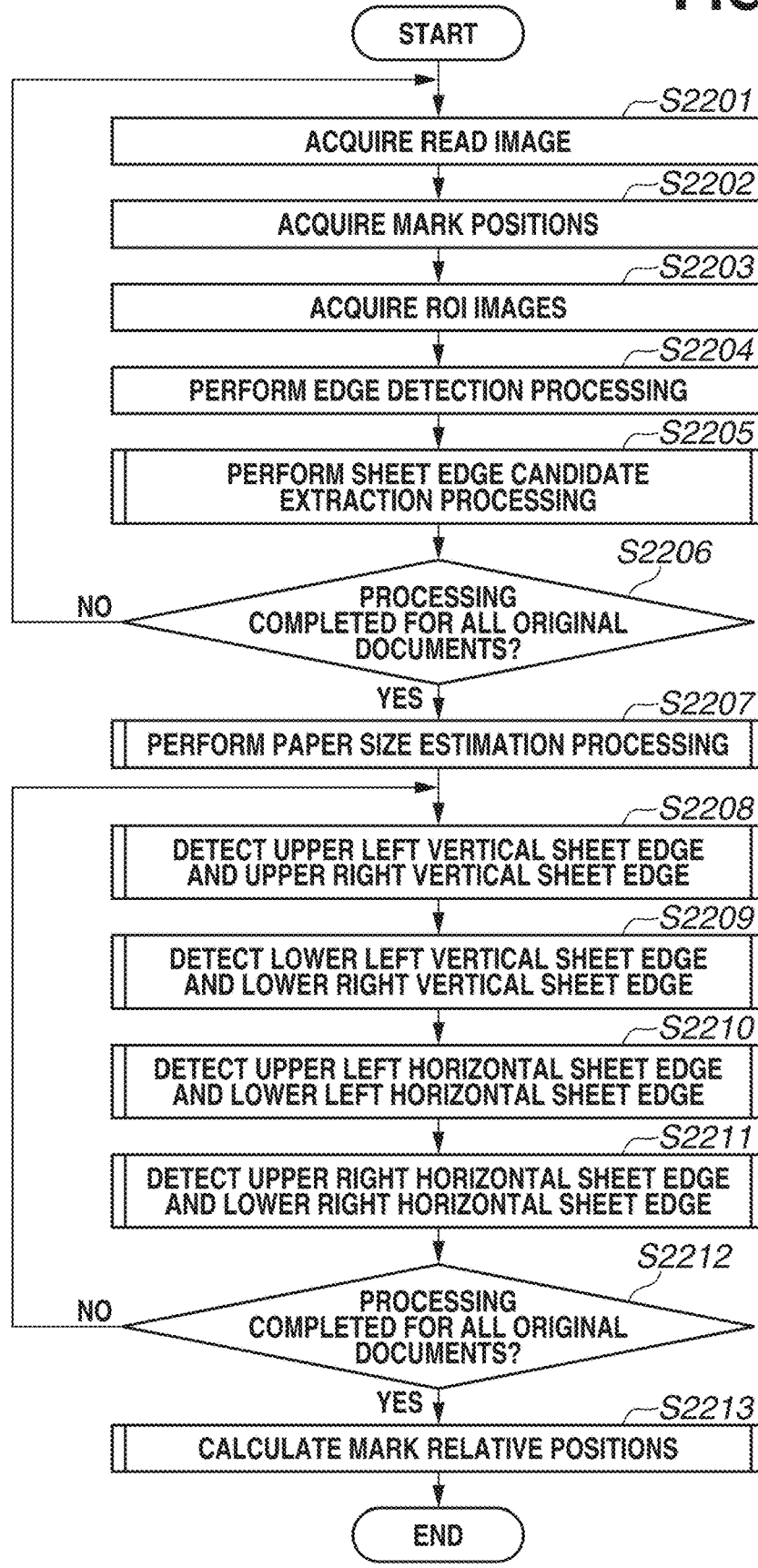
FIG. 22 is a flowchart illustrating an operation of processing of measuring mark relative positions from a plurality of read images.

The operation of a printing position measurement unit will be described with reference to a flowchart in FIG. 22 and FIG. 6.

In step S2201, the CPU 114 acquires a read image of an adjustment chart via an image reading unit 130. The image reading unit 130 may be an external reader such as an ADF, or may be a reader installed in a printer, including an in-line sensor.

In step S2202, the CPU 114 acquires the position of each of marks 602 to 605 from the read image. The mark position is expressed as two-dimensional coordinates in a horizontal direction (x) and a vertical direction (y) of a scanned image, and the upper left coordinates are defined as the origin point (0,0). The mark position may be expressed as the barycentric coordinates of the mark or may be calculated with subpixel accuracy. Further, the processing of detecting the mark may be performed using a pattern matching method.

In step S2203, the CPU 114 acquires an ROI image (partial image) based on the acquired mark position. This processing is similar to that in step S1101, and upper, lower, left, and right ROI images of all four corners are acquired.

In step S2204, the CPU 114 applies an edge detection filter to each of the acquired ROI images. This processing is similar to that in step S1102.

In step S2205, the CPU 114 performs sheet edge extraction processing for the result of step S2204. This processing is similar to that in step S1103. A Hough table and sheet edge candidates are extracted for each of the eight ROI images in step S2205.

In step S2206, the CPU 114 determines whether the processing in step S2201 to step S2205 is completed for all the original documents. If the processing is completed (YES in step S2206), the processing proceeds to step S2207. Otherwise (NO in step S2206), the processing returns to step S2201.

In step S2207, the CPU 114 estimates the paper size of the original document, from the plurality of sheet edge candidates and the Hough table acquired in step S2205. The details of this processing will be described below.

In step S2208, the CPU 114 detects an upper left vertical sheet edge and an upper right vertical sheet edge. This processing is similar to that in step S804. However, the paper size estimated in step S2207, not the standard value, is used.

In step S2209, the CPU 114 detects a lower left vertical sheet edge and a lower right vertical sheet edge. This processing is similar to that in step S805. However, the paper size estimated in step S2207, not the standard value, is used.

In step S2210, the CPU 114 detects an upper left horizontal sheet edge and a lower left horizontal sheet edge. This processing is similar to that in step S806. However, the paper size estimated in step S2207, not the standard value, is used.

In step S2211, the CPU 114 detects an upper right horizontal sheet edge and a lower right horizontal sheet edge. This processing is similar to that in step S807. However, the paper size estimated in step S2207, not the standard value, is used.

In step S2212, the CPU 114 determines whether the processing in step S2208 to step S2211 is completed for all the original documents. If the processing is completed (YES in step S2212), the processing proceeds to step S2213. Otherwise (NO in step S2212), the processing returns to step S2208.

In step S2213, the CPU 114 calculates mark relative positions from the eight sheet edges detected for the plurality of scanned images. In this processing, distances A to H in FIG. 6 are calculated for each of the scanned images, by calculating the normal line distance from the marker center coordinates to a linear equation ($\rho = x \cos \theta + y \sin \theta$) of each of the sheet edges. Further, a mark relative average position is calculated by determining an average value of the distances A to H calculated for each of the scanned images, and the calculated mark relative average position is used as a correction value.

<Paper Size Estimation Processing>

Figure 23:
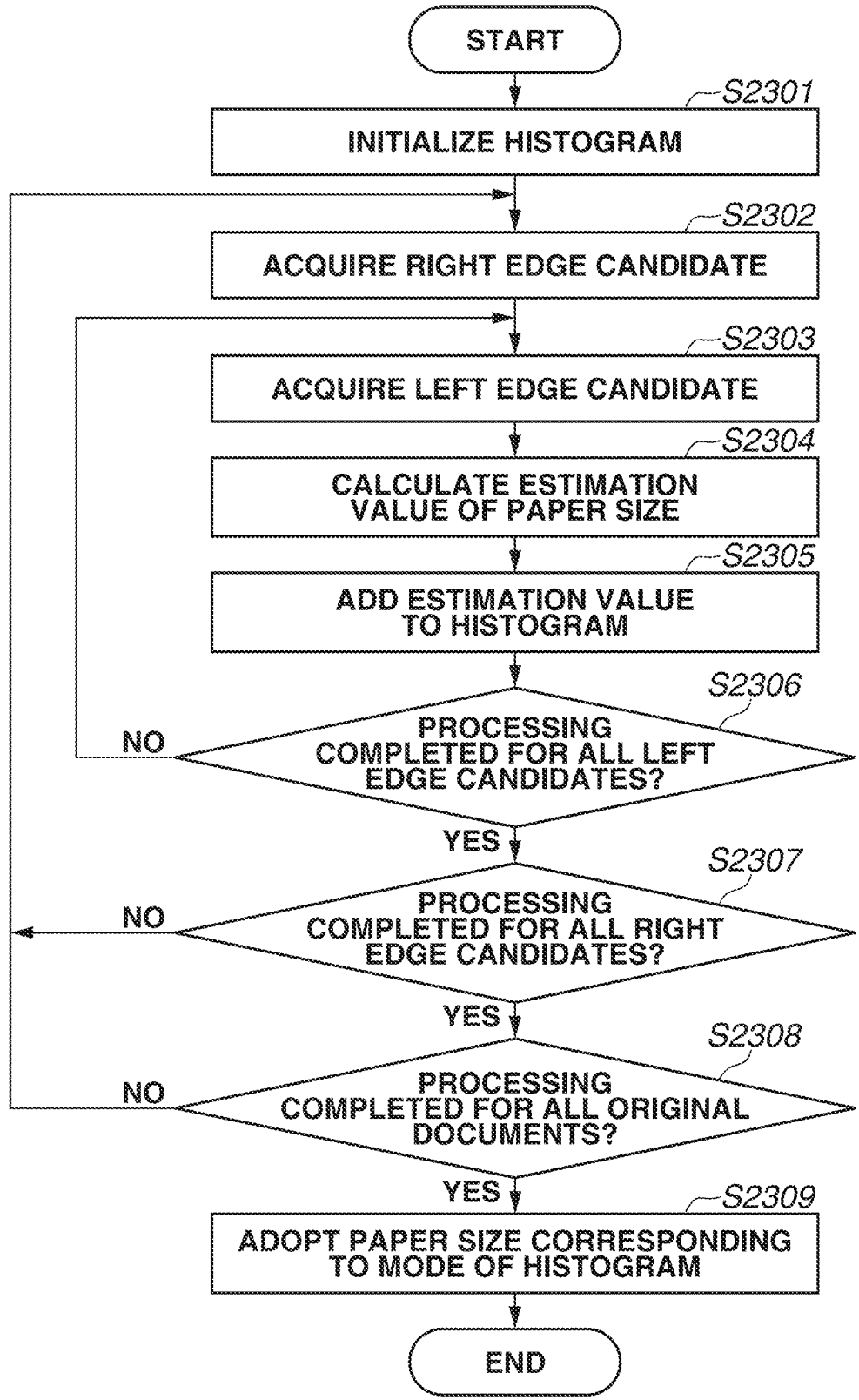
FIG. 23 is a flowchart illustrating an operation of paper size estimation processing.

The paper size estimation processing in step S2207 will be described in detail with reference to a flowchart in FIG. 23. Here, the calculation of a left-right paper size will be described as an example, and an upper-lower paper size is also similarly estimated. In this case, the right and left are replaced with the upper and lower to execute the processing.

Figure 24:
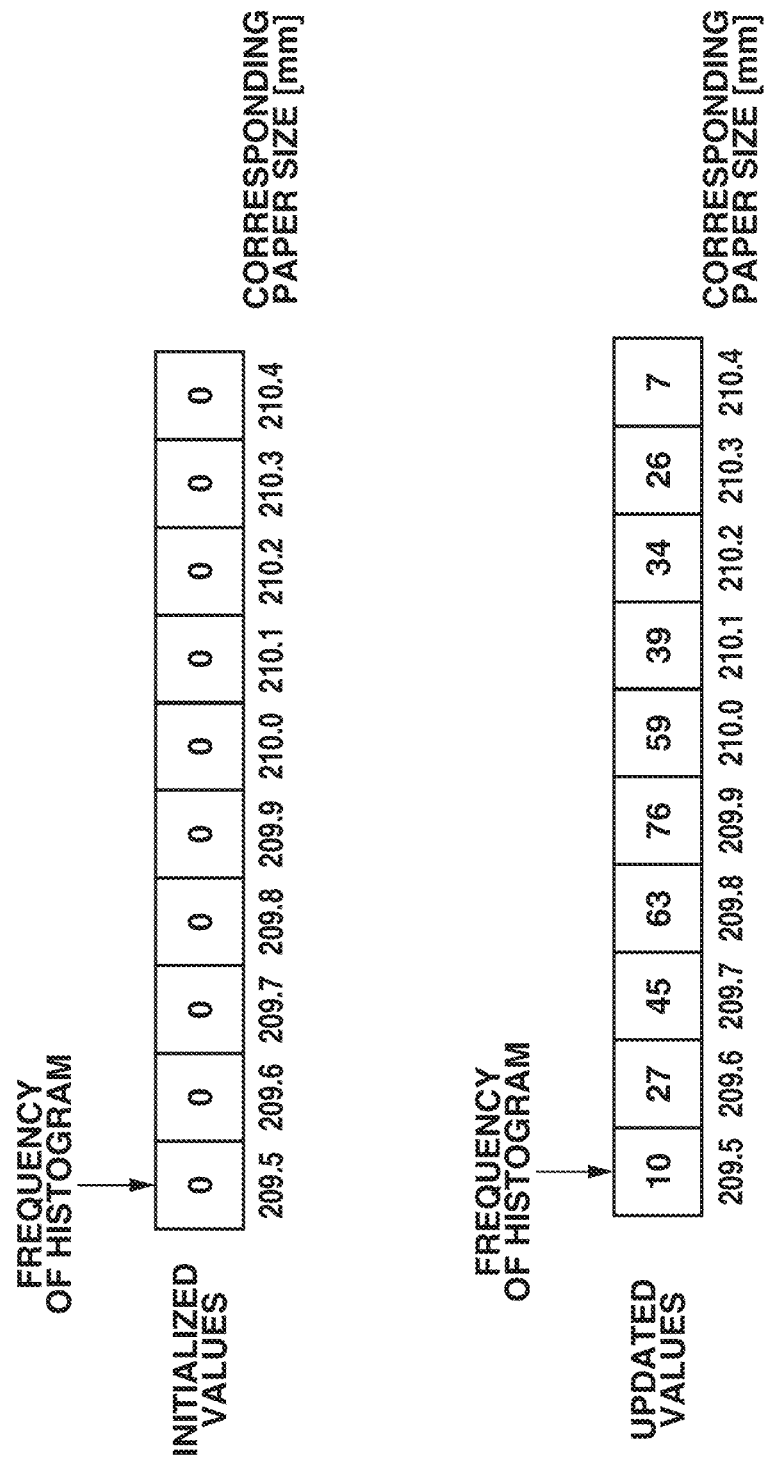
FIG. 24 is a diagram illustrating histogram information for paper size estimation values.

In step S2301, the CPU 114 initializes a numeric value of a histogram value storage memory to 0. FIG. 24 illustrates, in an upper part thereof, the histogram value storage memory initialized by this processing. As illustrated in FIG. 24, in the present exemplary embodiment, ten arrays are secured to build a histogram formed by dividing 209.5 mm to 210.4 mm by 0.1 mm interval. In each of the arrays, the frequency of appearance of an estimation value of the corresponding paper size is stored, and 0 is stored by this initialization processing.

In step S2302, the CPU 114 acquires a right edge candidate $\rho R$, $\theta R$ acquired in the sheet edge candidate extraction processing in step S2205.

In step S2303, the CPU 114 acquires a left edge candidate $\rho L$, $\theta L$ acquired in the sheet edge candidate extraction processing in step S2205.

In step S2304, the CPU 114 calculates an estimation value (estimation result) of the paper size, using the left and right edge candidates (edge information). Specifically, the estimation value is calculated by the following expression.

$$(\rho_R - \rho_L) \cos \theta_L * 25.4 / \text{dpi}$$

In step S2305, the CPU 114 updates the corresponding value of the histogram based on the estimation value. For example, in a case where the estimation value of the paper size calculated in step S2304 is 209.8 mm, 1 is added to the numeric value of the fourth histogram bin from the left in FIG. 24. In this processing, the numeric value of the histogram may be updated by weighting depending on the intensity of the edge candidate. For example, the histogram can reflect the likelihood of the paper candidate, by adding the value of the Hough table corresponding to this edge candidate to the corresponding histogram bin.

In step S2306, the CPU 114 determines whether the processing in step S2302 to step S2305 is completed for all the left edge candidates. If the processing is completed (YES in step S2306), the processing proceeds to step S2307. Otherwise (NO in step S2306), the processing returns to step S2303.

In step S2307, the CPU 114 determines whether the processing in step S2302 to step S2306 is completed for all the right edge candidates. If the processing is completed (YES in step S2307), the processing proceeds to step S2308. Otherwise (NO in step S2307), the processing returns to step S2302.

In step S2308, the CPU 114 determines whether the processing in step S2302 to step S2307 is completed for all the original documents. In other words, the CPU 114 determines whether the estimation results of all the original documents are aggregated. If the processing is completed (YES in step S2308), the processing proceeds to step S2309. Otherwise (NO in step S2308), the processing returns to step S2302.

Figure 25:
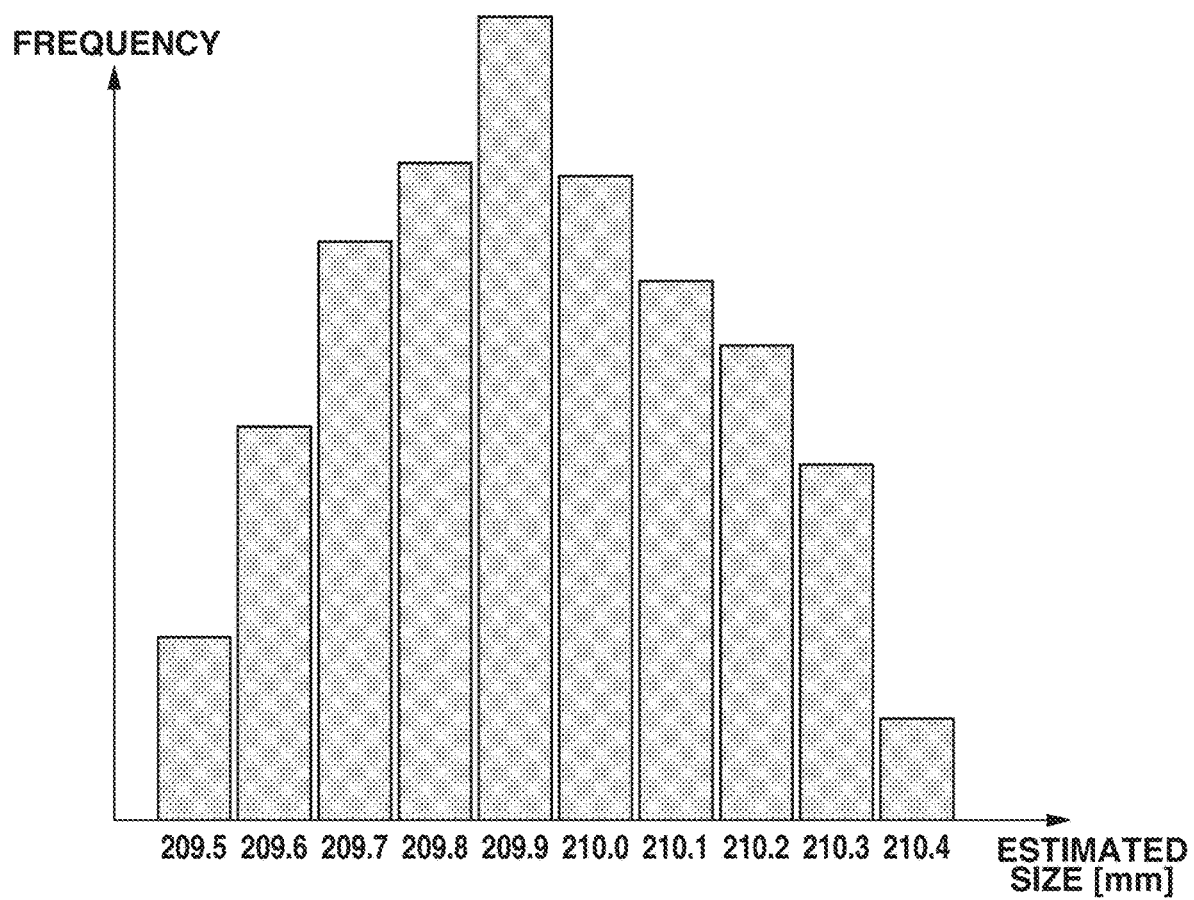
FIG. 25 is a diagram illustrating a visualized example of the histogram information for paper size estimation values.

In step S2309, the CPU 114 adopts the paper size corresponding to the mode value of the histogram, as the estimation value of the paper size representing the plurality of sheets. FIG. 25 is a graph illustrating the updated histogram values in FIG. 24. Since the mode value of this histogram is 76, the estimated paper size is 209.9 mm.

<Use Sequence>

Figure 26:
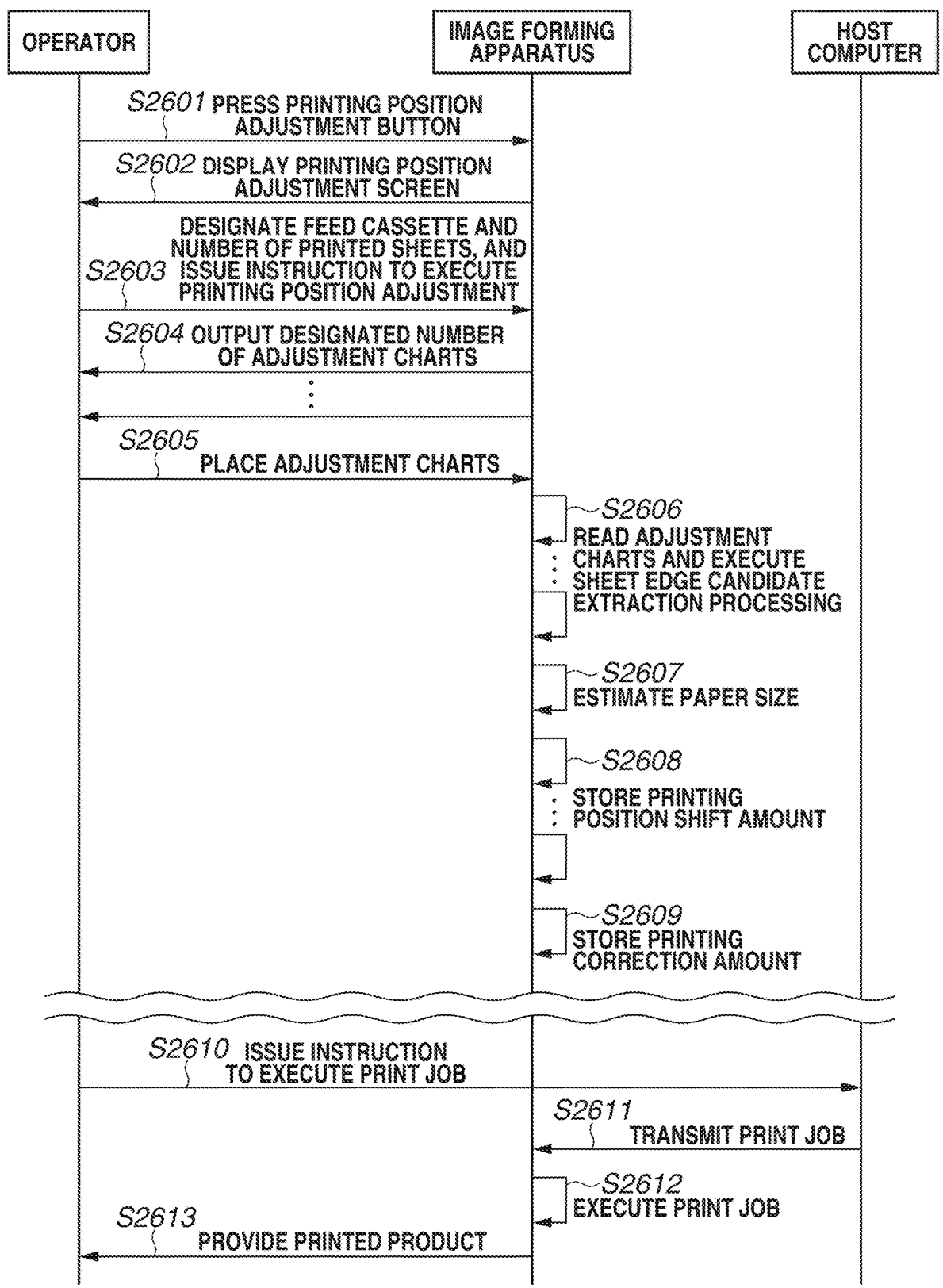
FIG. 26 is a sequence diagram illustrating a series of steps of processing according to a third exemplary embodiment.

FIG. 26 is a sequence diagram illustrating a series of steps of the processing according to the present exemplary embodiment. In the present exemplary embodiment, the main exchange is carried out between an operator and the image forming apparatus 100. In this sequence diagram, the sequence begins in a state where a sheet library edit screen 300 is displayed. In the present exemplary embodiment, unlike the first exemplary embodiment, the plurality of original documents is read and a printing position shift amount is adjusted.

First, in step S2601, when the operator presses a printing position adjustment button 323, the image forming apparatus 100 determines to start a printing position adjustment. Subsequently, in step S2602, the image forming apparatus 100 displays a printing position adjustment screen for designating a feed cassette and the number of printed sheets, via the CPU 114.

Next, in step S2603, the operator designates a feed cassette and the number of printed sheets, and issues an instruction to execute printing position adjustment processing. In this process, the image forming apparatus 100 displays a screen for designating the number of printed sheets of a printing adjustment chart on the console panel 120, via the CPU 114. The operator designates the desired number of sheets on the console panel 120 and issues a print instruction.

Next, in step S2604, the image forming apparatus 100 outputs the adjustment charts illustrated in FIG. 6, via the CPU 114.

Next, in step S2605, the operator places the designated number of adjustment charts output in step S2604, in the image reading unit 130.

Next, in step S2606, the image forming apparatus 100 reads the plurality of adjustment charts placed in the image reading unit 130 and executes the sheet edge candidate extraction processing in step S2201 to step 2206, via the CPU 114.

Next, in step S2607, the image forming apparatus 100 estimates the paper size for each feed cassette, via the CPU 114.

Next, in step S2608, the image forming apparatus 100 executes the printing position adjustment processing in step S2207 to step S2211 via the CPU 114, thereby storing the printing position shift amount for each of the read images.

Next, in step S2609, the image forming apparatus 100 stores a printing correction amount calculated by taking the average of the printing position shift amounts of the respective read images, via the CPU 114.

In the present exemplary embodiment, the printing position adjustment is thus performed. Subsequently, the image is formed as follows, using the registered printing position shift amount.

Next, in step S2610, the operator issues an instruction to execute a print job to the host computer 101.

Next, in step S2611, the host computer 101 transmits the print job to the image forming apparatus 100.

Next, in step S2612, the image forming apparatus 100 executes the print job. In this process, the printing position shift amount registered for the feed cassette is read out from the sheet library and then used for the execution of the print job.

Next, in step S2613, the image forming apparatus 100 provides a printed product generated by the execution of the print job.

<Remarks>

According to the present exemplary embodiment, the sheet edge pair can be accurately searched for, even in a case where there is a difference between the standard value of the sheet size and the read image size of the original document, for reasons such as a variation in conveyance speed during image reading, moisture absorption, and an error in sheet cutting.

In the first and second exemplary embodiments, the method of selecting the optimum sheet edge pair by estimating the angle corresponding the lost parallelism between the upper and lower edges of the adjustment chart is described. This loss of the angle parallelism is greater as the paper conveyance length is longer. The loss of the parallelism also varies depending on the weight (basis weight) of the sheet. Thus, in a fourth exemplary embodiment, there will be described an example in which a parameter is dynamically changed based on how the parallelism between upper and lower edges is lost, depending on information of a sheet library. The configuration of a print system in the fourth exemplary embodiment is substantially identical to that in the first exemplary embodiment. Thus, components and steps identical to those of the first exemplary embodiment are assigned the same reference numerals as those of the first exemplary embodiment, and the detailed description thereof will be omitted. A sheet edge pair determination unit that is a point different from the first and second exemplary embodiments will be described.

First, a distortion coefficient to be used when a sheet edge pair is determined will be described. As described above, a list storing various kinds of information of sheets to be used for printing is prepared as the sheet library. A sheet list 310 in FIG. 3 displays a list of sheets stored in the sheet library. In the sheet list 310, sheet attributes indicated by columns 311 to 315 are presented for each sheet to an operator, as additional information. The column 312 and the column 313 represent a sub-scanning direction sheet length and a main-scanning direction sheet length, respectively, of each sheet. The column 314 represents the basis weight of each sheet.

Based on the sheet length and the basis weight from among this sheet information, a skew amount and a distortion amount of an image caused by conveyance during reading using an ADF are estimated, and the estimation value obtained thereby is held as the distortion coefficient. This distortion coefficient is greater, as the basis weight is higher and the sheet conveyance length is longer. This estimated distortion amount is calculated for each sheet. In this process, the length of conveyance in the ADF is used, and thus the length in sub-scanning direction in printing is not necessarily the same as the length of conveyance in the ADF. The sheet edge pair is estimated using this distortion coefficient.

Figure 11:
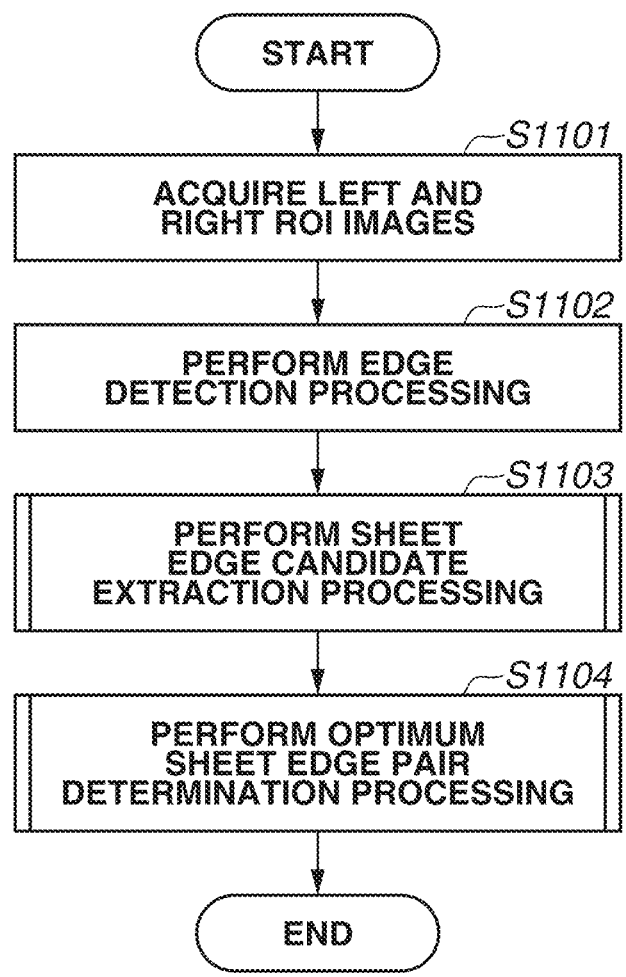
FIG. 11 is a flowchart illustrating an operation of vertical sheet edge detection processing.

Processing of detecting vertical sheet edges to be performed in step S804 and step S805 in FIG. 8 is similar to the processing of the flowchart in FIG. 11 according to the first exemplary embodiment, and thus the description thereof will be omitted.

Figure 18:
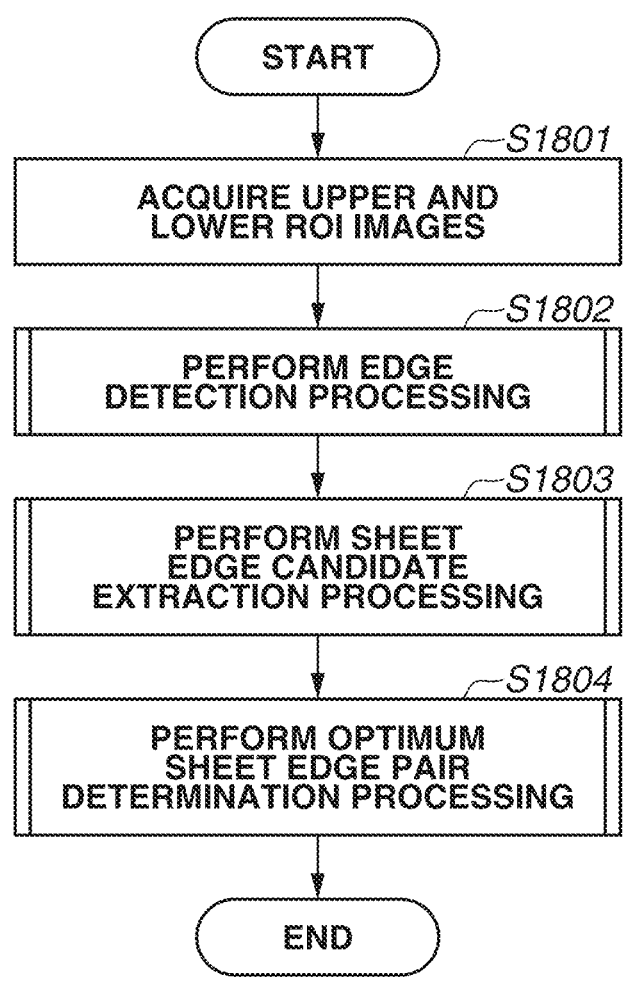
FIG. 18 is a flowchart illustrating an operation of horizontal sheet edge detection processing.

Next, processing of detecting horizontal sheet edges to be performed in step S806 and step S807 will be described with reference to the flowchart in FIG. 18 used for the description of the first exemplary embodiment.

In step S1801, the CPU 114 acquires upper and lower ROI images based on mark positions acquired in step S802. A technique therefor is similar to that described in the first exemplary embodiment. A method of acquiring upper and lower ROI images in a case where an upper right horizontal sheet edge and a lower right horizontal sheet edge are extracted is also similar to that described in the first exemplary embodiment.

In step S1802, the CPU 114 applies an edge detection filter to each of the upper and lower ROI images acquired in step S1801. In the present exemplary embodiment, a differential filter for top and bottom is used as the edge detection filter, but the present disclosure is not limited thereto. The edge detection filter may be other type of filter such as a vertical Laplacian filter.

In step S1803, the CPU 114 detects a plurality of both sheet edge candidates from the image after the edge detection filter is applied. This processing is similar to that in step S1103 described in the first exemplary embodiment.

In step S1804, the CPU 114 determines the optimum pair from the detected plurality of sheet edge candidates. The basic flow of this processing is also similar to that described with reference to step S1104 in the first exemplary embodiment. However, a correction value is given based on not only the roller speed difference described in the first exemplary embodiment, but also the above-described sheet distortion coefficient.

This distortion coefficient uses ε in the above-described equation (6) and equation (7) as a variable depending on the distortion coefficient, not as a constant. When the distortion coefficient is d, the equation is transformed as follows.

$$l = |psize - (\rho_T - \rho_B)\cos \theta_{ave} * 25.4/\ dpi| + \gamma \text{step}\ (|\theta_T - \theta_B + \Delta\theta| - \varepsilon(d)) \quad (8)$$

As described in the first exemplary embodiment, ε is a parameter for a penalty term based on the parallelism of the sheet. More specifically, no penalty is given when the difference between θT and θB is less than or equal to the parameter ε, and 1000 penalties are given in other cases. This threshold for generating penalty is dynamically changed based on the distortion coefficient. For a sheet with a large distortion coefficient (a sheet that tends to be read with a large distortion), the value of this parameter ε is large, e.g., 1° to have a large permissible amount of a variation in angle. On the contrary, for a sheet with a small distortion, the value of the parameter ε is more strictly set, for example, a value of 0.5° is set.

The optimum combination of four edges depending on the print sheet is determined by adding this parameter ε to the equation as a variable based on the distortion coefficient.
<Remarks>

According to the present exemplary embodiment, it is possible to search for the sheet edge pair more accurately in conjunction with the distortion width depending on the property of the sheet. Non-detection of the pair can be prevented also for a sheet that tends to be read with a large distortion.

In the present exemplary embodiment, the ADF conveyance length and the basis weight of the sheet are used as the information for calculating the distortion coefficient, but it is not limited thereto. If there is some information to give a distortion of an image to the ADF, such information may be added.

Other Exemplary Embodiments

Figure 9A:
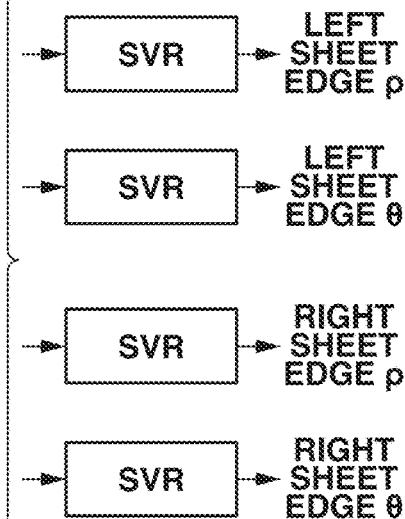
FIGS. 9A and 9B are diagrams each illustrating input data and output data for operation by machine learning.
Figure 9B:
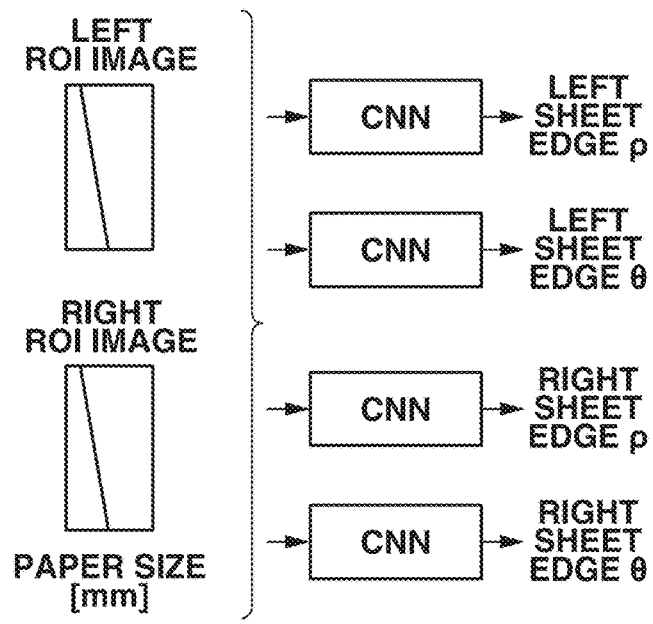

In the above-described exemplary embodiments, the mark relative positions are calculated based on the Hough transform and the edge detection processing, but this may be implemented by machine learning. For example, as illustrated in FIG. 9A, Support Vector Regression (SVR) that receives a Hough table and a paper size as input and outputs left and right (ρ, θ) may be built. In this case, training data is obtained by executing the Hough transform in step S1302 for a read image acquired beforehand, and correct answer data is the left and right (ρ, θ) values tagged manually. Further, as illustrated in FIG. 9B, a model that receives image data and a paper size as input and outputs a sheet edge position using a convolutional neural network (CNN) may be built. In training the model, the number of training data may be increased by image processing, i.e., applying random micro-scaling and micro-angle rotation to a scanned image.

The present disclosure can also be implemented by processing for supplying a program for implementing one or more functions in the above-described exemplary embodiments to a system or an apparatus via a network or a storage medium and causing one or more processors in a computer of the system or apparatus to read and execute the program. The present disclosure can also be implemented by a circuit that implements one or more functions (e.g., an application specific integrated circuit (ASIC)).

The present disclosure may be applied to a system including a plurality of devices, or may be applied to an apparatus consisting of one device. For example, there may be adopted such a configuration that an apparatus including the image reading unit 130 and an apparatus including the image forming unit 150 are provided as separate apparatuses and linked by communication. Further, there may be adopted such a configuration that an apparatus that performs image formation and an apparatus that performs image processing are provided as separate apparatuses and linked by communication.

The present disclosure is not limited to each of the above-described exemplary embodiments, and various modifications (including organic combinations of the exemplary embodiments) can be made without departing from the gist of the present disclosure, and those are not excluded from the scope of the present disclosure. In other words, the configurations of combinations of the above-described exemplary embodiments and the modifications thereof are all included in the present disclosure.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Applications No. 2020-120865, filed Jul. 14, 2020, No. 2020-171564, filed Oct. 9, 2020, and No. 2021-091615, filed May 31, 2021, which are hereby incorporated by reference herein in their entirety.

What is claimed is:

1. An image reading apparatus comprising:
    a conveyor;
    a reader configured to read an image from a sheet conveyed by the conveyor, wherein the sheet is an adjustment chart document having marks printed as part of the image at predetermined positions, and having edges that include a left edge, a right edge, a top edge, and a bottom edge; and
    one or more processors configured to perform operations including:
    causing the reader to read the image from the sheet to obtain a read image,
    acquiring, from the read image and based on the marks printed at the predetermined positions, left and right regions of interest (ROI) images, each including at least a shadow of a respective edge of the sheet, and
    after acquiring the left and right ROI images, performing edge detection processing as follows:
    extracting, from the left and right ROI images, a plurality of first sheet edge candidates and a plurality of second sheet edge candidates on an opposite edge from the first sheet edge candidates, by performing a binarization process and Hough transform process on data resulting from the binarization process, and
    determining a sheet edge pair from among the plurality of first sheet edge candidates and the plurality of second sheet edge candidates.

2. The image reading apparatus according to claim 1, wherein the one or more processors perform further operations including acquiring a parameter, based on at least position information of the marks in the image and position information corresponding to one edge of the edges.

3. The image reading apparatus according to claim 2, wherein the one or more processors perform further operations including controlling a printer to print an image subjected to position adjustment based on at least the acquired parameter.

4. The image reading apparatus according to claim 2, wherein the edges are a combination of edges in which an absolute value of a difference between angles is less than or equal to a threshold among the plurality of second sheet edge candidates, and which satisfy a predetermined relationship between a distance between edges and a length of the sheet in a predetermined direction.

5. The image reading apparatus according to claim 1, wherein the one or more processors perform further operations including performing a filter operation for a partial image of the image.

6. The image reading apparatus according to claim 1, wherein the one or more processors perform further operations including identifying a pixel position at which a response of detection of the plurality of second sheet edge candidates is maximum, in neighboring pixels of the edges, and executing linear approximation for the identified pixel position.

7. The image reading apparatus according to claim 1, wherein the edges correspond to edges along a conveying direction from among the edges of the sheet.

8. The image reading apparatus according to claim 1, wherein the reader includes a contact image sensor (CIS) configured to read the image from the conveyed sheet.

9. The image reading apparatus according to claim 8, wherein the reader includes a white member facing the CIS.

10. A method for controlling an image reading apparatus having a conveyor, and a reader configured to read an image from a sheet conveyed by the conveyor, wherein the sheet is an adjustment chart document having marks printed as part of the image at predetermined positions, and having edges that include a left edge, a right edge, a top edge, and a bottom edge, the method comprising:
    reading the image from the sheet to obtain a read image;
    acquiring, from the read image and based on the marks printed at the predetermined positions, left and right regions of interest (ROI) images, each including at least a shadow of a respective edge of the sheet; and
    after acquiring the left and right ROI images, performing edge detection processing as follows:
    extracting, from the left and right ROI images, a plurality of first sheet edge candidates and a plurality of second sheet edge candidates on an opposite edge from the first sheet edge candidates, by performing a binarization process and Hough transform process on data resulting from the binarization process, and
    determining a sheet edge pair from among the plurality of first sheet edge candidates and the plurality of second sheet edge candidates.

11. A non-transitory computer-readable storage medium storing computer-executable instructions for causing a computer to execute a method for controlling an image reading apparatus having a conveyor, and a reader configured to read an image from a sheet conveyed by the conveyor, wherein the sheet is an adjustment chart document having marks printed as part of the image at predetermined positions, and having edges that include a left edge, a right edge, a top edge, and a bottom edge, the method comprising:
    reading the image from the sheet to obtain a read image;
    acquiring, from the read image and based on the marks printed at the predetermined positions, left and right regions of interest (ROI) images, each including at least a shadow of a respective edge of the sheet; and after acquiring the left and right ROI images, performing edge detection processing as follows:

extracting, from the left and right ROI images, a plurality of first sheet edge candidates and a plurality of second sheet edge candidates on an opposite edge from the first sheet edge candidates, by performing a binarization process and Hough transform process on data resulting from the binarization process, and determining a sheet edge pair from among the plurality of first sheet edge candidates and the plurality of second sheet edge candidates.

12. The image reading apparatus according to claim 1, wherein the reader reads the sheet against a background of a white member.

13. The image reading apparatus according to claim 1, wherein, in a case where a leading edge of the sheet conveyed by the conveyor is the top edge of the sheet, performing the edge detection processing further includes setting an angular difference to zero where the angular difference is a correction value regarding parallelism between the left edge and the right edge of the sheet.

14. The image reading apparatus according to claim 1, wherein the sheet edge pair is from a first sheet edge candidate from one of the left ROI image and the right ROI image and a plurality of second sheet edge candidates from the other of the left ROI image and the right ROI image and the sheet edge pair forms an optimum sheet edge pair based on parallelism of each first-second sheet edge pair and size information of the sheet.

15. The image reading apparatus according to claim 14, wherein acquiring includes acquiring, from the read image and based on the marks printed at the predetermined positions, top and bottom ROI images, each including at least a shadow of a respective edge of the sheet, and after acquiring the top and bottom ROI images, wherein performing the edge detection processing further includes:

extracting a third sheet edge candidate from one of the top ROI image and the bottom ROI image and extracting a plurality of fourth sheet edge candidates from the other of the top ROI image and the bottom ROI image by performing a binarization process and Hough transform process on data resulting from the binarization process, and determining, from the plurality of fourth sheet edge candidates, one fourth sheet edge candidate that forms an optimum sheet edge pair with the third sheet edge candidate based on parallelism of each third-fourth sheet edge pair and the size information of the sheet.

16. The image reading apparatus according to claim 15, wherein, in a case where a leading edge of the sheet conveyed by the conveyor is the top edge of the sheet, performing the edge detection processing further includes setting an angular difference to greater than zero where the angular difference is a correction value regarding the parallelism between the top edge and the bottom edge of the sheet.

17. The image reading apparatus according to claim 16, wherein the angular difference is set to three degrees.

\* \* \* \* \*